US012640567B1

(12) United States Patent
Hu et al.

(10) Patent No.: US 12,640,567 B1
(45) Date of Patent: May 26, 2026

(54) SYSTEM FOR IDENTIFYING VOLTAGE SAG DOMAINS GENERATED BASED ON MULTIPLE UNCERTAINTY SCENARIOS

(71) Applicant: SICHUAN UNIVERSITY, Sichuan (CN)

(72) Inventors: Wenxi Hu, Chengdu (CN); Xinyue Song, Chengdu (CN); Xianyong Xiao, Chengdu (CN); Haodong Wu, Chengdu (CN); Xiaoyi Huang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 19/063,276

(22) Filed: Feb. 25, 2025

(30) Foreign Application Priority Data

Jan. 20, 2025 (CN) .......................... 202510085208.6

(51) Int. Cl.
*H02J 3/38* (2006.01)
*H02J 3/00* (2006.01)
*H02J 3/16* (2006.01)

(52) U.S. Cl.
CPC .............. *H02J 3/381* (2013.01); *H02J 3/003* (2020.01); *H02J 3/004* (2020.01); *H02J 3/16* (2013.01); *H02J 2203/20* (2020.01); *H02J 2300/24* (2020.01)

(58) Field of Classification Search
CPC .. H02J 3/381; H02J 3/003; H02J 3/004; H02J 3/16; H02J 2300/24; H02J 2203/20
USPC .......................................................... 307/25
See application file for complete search history.

(56) References Cited

U.S. PATENT DOCUMENTS 6,104,102 A * 8/2000 Tsuji ....................... H02J 9/062
307/64
9,728,970 B2 * 8/2017 Li ............................ H02J 3/48
(Continued)

FOREIGN PATENT DOCUMENTS

CN 108400595 A 8/2018
CN 109975662 A 7/2019
(Continued)

OTHER PUBLICATIONS

Lv, Jinbing et al., Stochastic Estimation of Voltage Sag Considering Output Correlation of Renewable Energy Sources, Electric Power Construction, 39(10): 71-81, 2018.
(Continued)

*Primary Examiner* — Alfonso Perez Borroto
(74) *Attorney, Agent, or Firm* — PORUS IP LLC

(57) ABSTRACT
The present disclosure discloses a system for identifying a voltage sag domain generated based on multiple uncertainty scenarios. The system includes a processor, a photovoltaic monitoring device, an electricity monitoring device, and regulation hardware. The processor is configured to: collect photovoltaic output power information of each photovoltaic site based on the photovoltaic monitoring device deployed at the each photovoltaic site on a distribution network, and train a DCGAN based on the photovoltaic output power information; generate a photovoltaic output scene using the DCGAN; determine, based on the photovoltaic output scene, one or more given parameters, a sensitive load threshold, and one or more structural parameters of an electricity system, a voltage sag domain identification result corresponding to the one or more given parameters and the sensitive load threshold.

9 Claims, 9 Drawing Sheets

(56)                    References Cited

U.S. PATENT DOCUMENTS

| | | | | |
|---|---|---|---|---|
| 10,333,299 B2 * | 6/2019 | Fontana | .............. | H02M 1/4208 |
| 10,439,392 B2 * | 10/2019 | Flett | .......................... | H02J 3/00 |
| 11,292,352 B1 * | 4/2022 | Keister | ................ | H02M 7/487 |
| 2011/0148195 A1 * | 6/2011 | Lee | ........................... | H02J 7/35 |
| | | | | 307/25 |
| 2023/0305050 A1 * | 9/2023 | Wang | ................... | G01R 31/086 |
| 2024/0250528 A1 | 7/2024 | Wang et al. | | |

FOREIGN PATENT DOCUMENTS

| | | | |
|---|---|---|---|
| CN | 111146777 A | 5/2020 | |
| CN | 118011136 A | 5/2024 | |
| CN | 118713025 A | 9/2024 | |
| CN | 118983852 A | 11/2024 | |

OTHER PUBLICATIONS

Xiao, Xianyong et al., High Quality Power Supply Operation Mode of Power Grid Line Reconstruction Considering Outage Probability of Sensitive Equipment, Power System Technology, 47(2): 584-593, 2023.

Yang, Da et al., Equipment Uncertainty Assessment Due to Voltage Sags Considering the Uncertainties of Invalidation Event and Its Severity, Applied Mechanics and Materials, 1347-1350, 2013.

Notification to Grant Patent Right for Invention in Chinese Application No. 202510085208.6 mailed on Aug. 4, 2025, 4 pages.

First Office Action in Chinese Application No. 202510085208.6 mailed on Jul. 2, 2025, 10 pages.

* cited by examiner

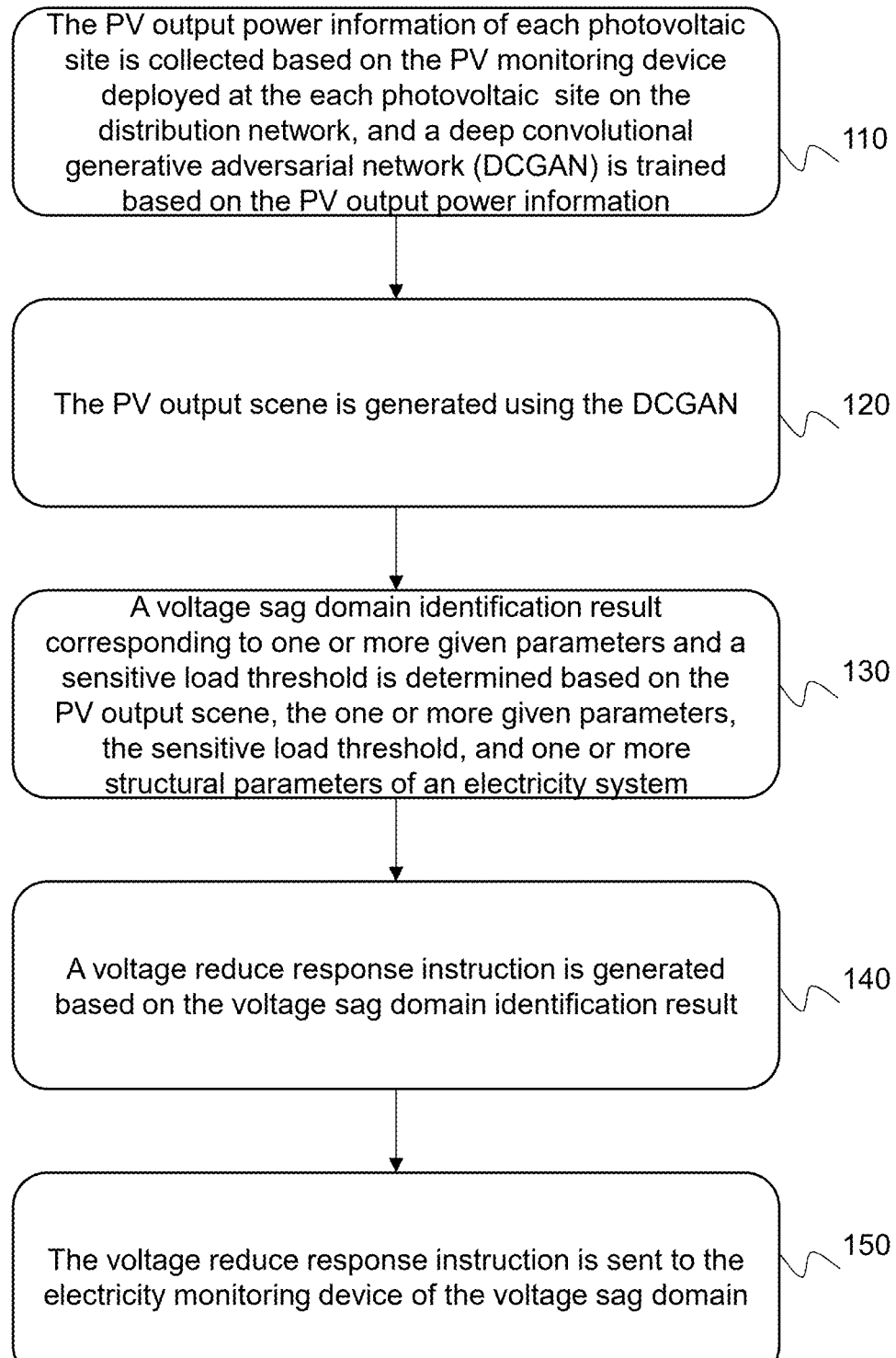

The PV output power information of each photovoltaic site is collected based on the PV monitoring device deployed at the each photovoltaic site on the distribution network, and a deep convolutional generative adversarial network (DCGAN) is trained based on the PV output power information     110

The PV output scene is generated using the DCGAN     120

A voltage sag domain identification result corresponding to one or more given parameters and a sensitive load threshold is determined based on the PV output scene, the one or more given parameters, the sensitive load threshold, and one or more structural parameters of an electricity system     130

A voltage reduce response instruction is generated based on the voltage sag domain identification result     140

The voltage reduce response instruction is sent to the electricity monitoring device of the voltage sag domain     150

FIG. 2

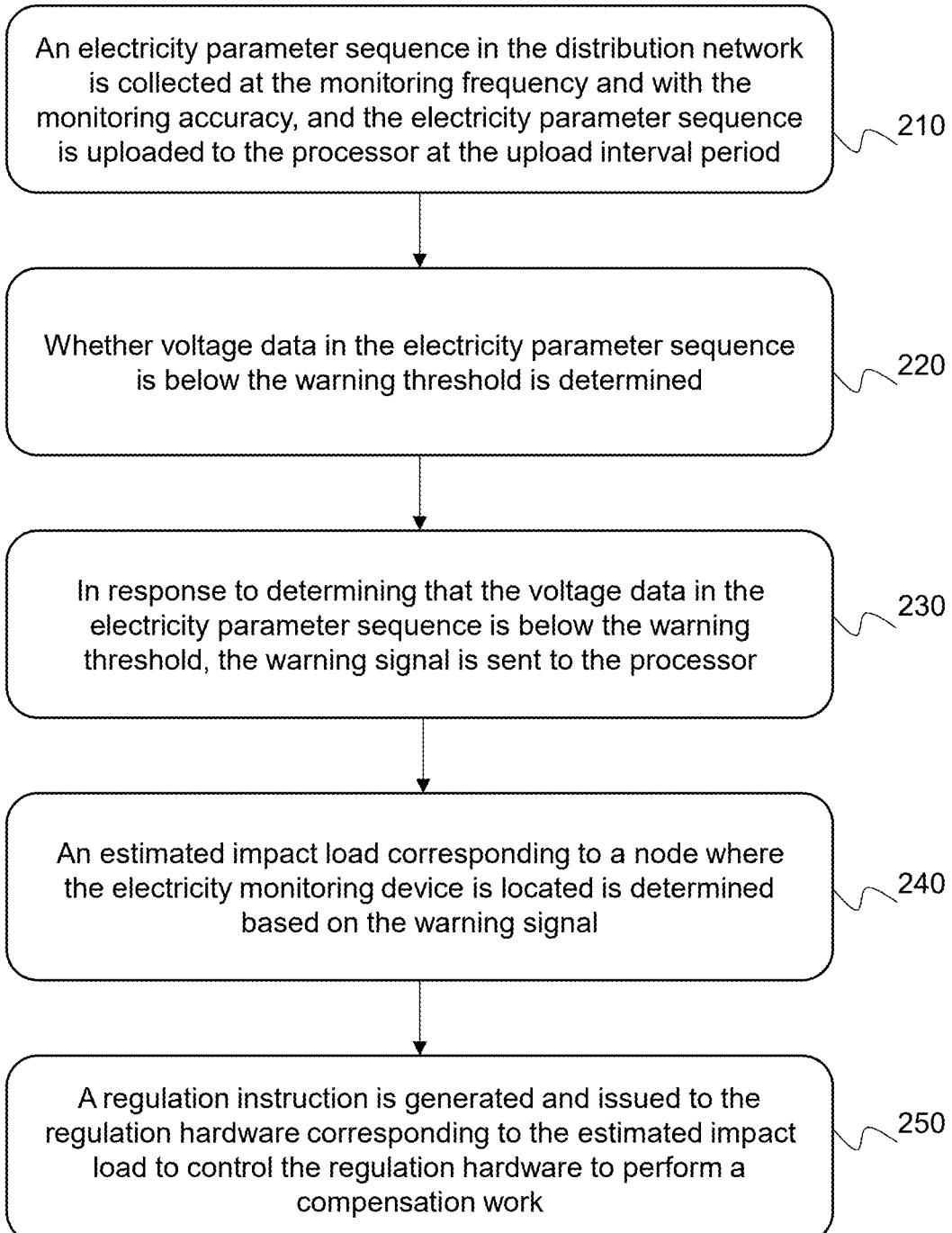

An electricity parameter sequence in the distribution network is collected at the monitoring frequency and with the monitoring accuracy, and the electricity parameter sequence is uploaded to the processor at the upload interval period    210

Whether voltage data in the electricity parameter sequence is below the warning threshold is determined    220

In response to determining that the voltage data in the electricity parameter sequence is below the warning threshold, the warning signal is sent to the processor    230

An estimated impact load corresponding to a node where the electricity monitoring device is located is determined based on the warning signal    240

A regulation instruction is generated and issued to the regulation hardware corresponding to the estimated impact load to control the regulation hardware to perform a compensation work    250

FIG. 3

SYSTEM FOR IDENTIFYING VOLTAGE SAG DOMAINS GENERATED BASED ON MULTIPLE UNCERTAINTY SCENARIOS

CROSS REFERENCE TO RELATED APPLICATIONS

This application claims priority to Chinese Patent Application No. 202510085208.6, filed on Jan. 20, 2025, the entire contents of each of which are incorporated herein by reference.

TECHNICAL FIELD

The present disclosure relates to the field of voltage sag domain identification, and in particular, to a system for identifying a voltage sag domain generated based on multiple uncertainty scenarios.

BACKGROUND

A voltage sag domain refers to a region of a concerned sensitive production device where an electricity fault point locates and makes the sensitive production device unable to work normally. A variety of manners have been used to identify voltage sag domains, such as a critical distance manner, a fault point manner, and an analytic manner, etc. The critical distance manner is used to identify the voltage sag domain by calculating a critical fault point that leads to a voltage sag of a sensitive load in the distribution network as well as a distance between the critical fault point and the bus where the sensitive load is located. The fault point manner refers to selecting some virtual fault points on a line, and through a short-circuit calculation manner, obtaining a voltage sag amplitude of the bus where the sensitive load is located when short-circuit fault occurs at the fault point. The fault point manner is used to determine whether the virtual fault point is in the voltage sag domain of the sensitive load. The analytical manner refers to a manner of calculating the voltage sag domain according to a sag amplitude analytical formula proposed by analyzing the short-circuit fault of the electricity system while comprehensively considering advantages and disadvantages of the critical distance manner and the fault point manner.

Nowadays, a widespread access to a distributed photovoltaic brings an uncertainty on a source side, making a voltage sag propagation show a new pattern, and an output of the voltage sag is affected by a light intensity, a temperature change, a load fluctuation, and other plurality of complex factors, and has a volatility. At the same time, an occurrence of voltage sag events in the distribution network has a randomness. Therefore, in a background of the distributed photovoltaic accessing to the distribution network, the fluctuation of the output of a plurality of units as well as the randomness of the occurrence of voltage sag events bring multiple uncertainties to the distribution network, which increases a difficulty of accurately identifying the voltage sag domain. Existing voltage sag domain identification often studies deterministic power sources, which considers that the distributed photovoltaic power remains unchanged. In this way, a fact that the distributed photovoltaic power is affected by the actual environment is ignored, which is stochastic and time-varying. In addition, an output power of the photovoltaic unit is mainly related to a light radiance, and meteorological conditions in a local region are correlated, so the distributed photovoltaic power output in the same region has a certain time and space correlation.

Existing photovoltaic output generation tends to regard the photovoltaic unit as independent, and the output generation is performed only for a single, independent photovoltaic unit, ignoring inter-unit correlations, resulting in scenario generation with low accuracy, and the existing method for identifying the voltage sag domain is unapplicable.

SUMMARY

Embodiments of the present disclosure provides a system for identifying a voltage sag domain generated based on multiple uncertainty scenarios. The system includes a processor, at least one photovoltaic monitoring device, an electricity monitoring device, and a regulation hardware. The processor is configured to: collect photovoltaic output power information of each photovoltaic site based on the photovoltaic monitoring device deployed at the each photovoltaic site on a distribution network, and train a deep convolutional generative adversarial network based on the photovoltaic output power information; generate a photovoltaic power scenario using the deep convolutional generative adversarial network; determine, based on the photovoltaic output scene, one or more given parameters, a sensitive load threshold, and one or more structural parameters of an electricity system, a voltage sag domain identification result corresponding to the one or more given parameters and the sensitive load threshold; generate a voltage reduce response instruction based on the voltage sag domain identification result; the voltage reduce response instruction including a monitoring frequency, a monitoring accuracy, an upload interval period, and a warning threshold for indicating the electricity monitoring device; send the voltage reduce response instruction to the electricity monitoring device of the voltage sag domain. The electricity monitoring device is configured to: collect an electricity parameter sequence in the distribution network at the monitoring frequency and with the monitoring accuracy, and upload the electricity parameter sequence to the processor at the upload interval period; determine whether voltage data in the electricity parameter sequence is below the warning threshold; and in response to determining that the voltage data in the electricity parameter sequence is below the warning threshold, send a warning signal to the processor. The processor is further configured to: determine an estimated impact load corresponding to a node where the electricity monitoring device is located based on the warning signal; and generate a regulation instruction and issue the regulation instruction to the regulation hardware corresponding to the estimated impact load to control the regulation hardware to perform a compensation work.

BRIEF DESCRIPTION OF THE DRAWINGS

To present disclosure is further illustrated by way of exemplary embodiments, which are described in detail by means of the accompanying drawings. These embodiments are not limiting, and in these embodiments the same numbering indicates the same structure, where:

FIG. 2 is a flowchart illustrating a process for determining a voltage sag domain identification result by a processor according to the present disclosure;

FIG. 3 is a flowchart illustrating a process for performing a compensation work by a processor and regulation hardware according to the present disclosure;

DETAILED DESCRIPTION

Figure 1:
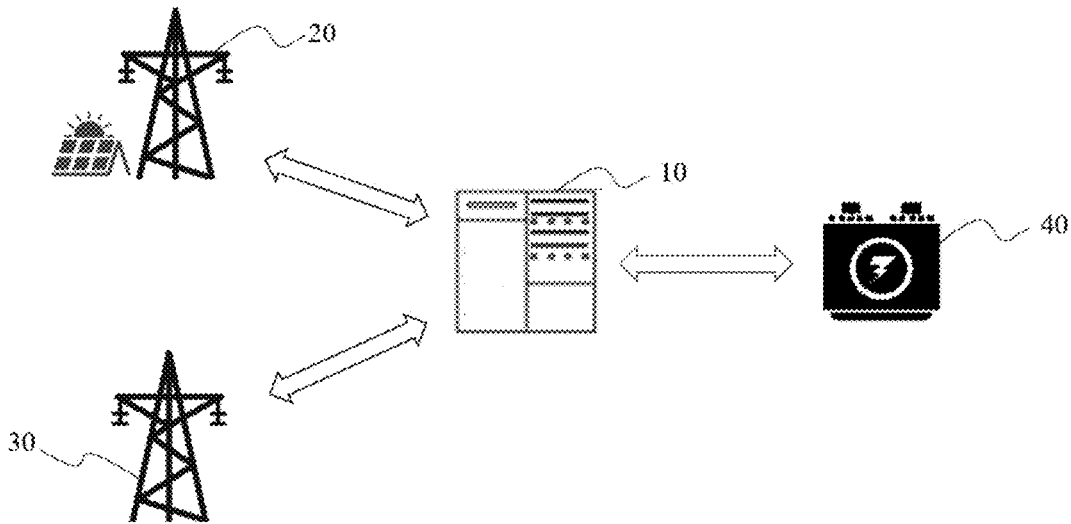
FIG. 1 is a diagram illustrating an exemplary scenario of a system for identifying a voltage sag domain generated based on multiple uncertainty scenarios according to the present disclosure.

The more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenes in accordance with these drawings without creative labor. Unless obviously obtained from the context or the context illustrates otherwise, the same numeral in the drawings refers to the same structure or operation.

It should be understood that the terms "system," "device," "unit," and/or "module" as used herein is a way to distinguish between different components, elements, parts, sections or assemblies at different levels. However, the words may be replaced by other expressions if other words accomplish the same purpose.

Flowcharts are used in the present disclosure to illustrate steps performed by a system according to embodiments of the present disclosure. It should be appreciated that the preceding or following steps are not necessarily performed in an exact sequence. Instead, steps may be processed in reverse order or simultaneously. Also, it is possible to add other steps to these processes, or to remove a step or steps from these processes.

It is to be noted that the embodiments and the features in the embodiments in the present disclosure are combined with each other without conflict, and the present disclosure is described in further detail below in conjunction with the accompanying drawings and with specific embodiments.

Referring to FIG. 1, the present disclosure provides a system for identifying a voltage sag domain based on multiple uncertainty scenarios, which includes a processor 10, a photovoltaic (PV) monitoring device 20, an electric monitoring device 30, and regulation hardware 40.

The processor 10 is used to process data and/or information obtained from the photovoltaic monitoring device 20, the electricity monitoring device 30, and the regulation hardware 40. In some embodiments, the processor 10 includes one or more hardware processors 10, such as a central processing unit, a programmable logic device, etc.

The photovoltaic monitoring device 20 refers to a device for monitoring an operation state of each photovoltaic site (e.g., a photovoltaic unit). In some embodiments, the photovoltaic monitoring device 20 includes, but is not limited to, a smart meter, a voltage/electric volume sensor, a photovoltaic array monitor, etc.

In some embodiments, the photovoltaic monitoring device 20 is used to collect photovoltaic output power information for each photovoltaic site.

The electricity monitoring device 30 is disposed on a distribution network and is used to obtain operation information (e.g., a voltage, a current, etc.) of the distribution network. In some embodiments, the electricity monitoring device 30 includes, but is not limited to, a voltage transformer, a current transformer, a smart meter, etc.

The regulation hardware 40 is a device for compensating for a load. In some embodiments, the regulation hardware 40 includes one or more of a backup electricity supply, a dynamic voltage regulator, and a load switch.

In some embodiments, a communication connection between the processor 10, the photovoltaic monitoring device 20, the electricity monitoring device 30, and the regulation hardware 40 are realized by wired or wireless means.

As shown in FIG. 1, in some embodiments, the processor 10 is configured to perform one or more of the following steps.

Step 110, the photovoltaic output power information of each photovoltaic site is collected based on the photovoltaic monitoring device 20 deployed at the each photovoltaic site on the distribution network, and a deep convolutional generative adversarial network (DCGAN) is trained based on the photovoltaic output power information.

In some embodiments, the photovoltaic output power information refers to an output power corresponding to each photovoltaic site. In some embodiments, the processor 10 collects the photovoltaic output power information for a time period (e.g., a year) for each photovoltaic site through the photovoltaic monitoring device 20.

In some embodiments, the processor 10 trains the DCGAN based on the photovoltaic output power information to enable a trained DCGAN to generate a photovoltaic output scene, which in turn enables a simulation of the multiple uncertainty scenes in the distribution network. The photovoltaic output scene includes a photovoltaic output power, and an adversarial network is capable of generating the photovoltaic output scene that is more comprehensive than an actual photovoltaic output scene.

A specific process for generating the photovoltaic output scene using the DCGAN is as follows.

First, the data is preprocessed: in the present disclosure, input data used for photovoltaic output scene generation is the photovoltaic output power information for N sites in a year. A year is regarded as 365 days, a data format of the photovoltaic output power information of the N sites in a year is converted to a three-dimensional (3D) matrix, a data size is expressed as N×T×D, where N denotes a total count of the photovoltaic sites; T takes a value of 24, indicating the data in 24 hours; D take a value of 365, indicating a total of 365 days in a year. In addition, historical photovoltaic data is divided into rainy season photovoltaic data and dry season photovoltaic data. The photovoltaic power information of all sites for each day may be recorded in a form of a two-dimensional (2D) matrix like $\{x_{n,t}\}$, where n denotes the count of sites, t denotes a moment, and $x_{n,t}$ denotes the photovoltaic power information of the nth site under the moment t, and a form of the input matrix is shown in formula (1):

$$X = \begin{bmatrix} x_{1,1} & \cdots & x_{1,24} \\ \vdots & \ddots & \vdots \\ x_{N,1} & \cdots & x_{N,24} \end{bmatrix} \tag{1}$$

Before inputting the data into the model, a feature scale needs to be performed on the data, i.e., to map raw data to a specific range, remove a unit uniform dimension, and produce a pure data sample, i.e., to normalize and standardize the data. Data normalization refers to limiting the data to a certain range, usually mapping the data to a range of −1 to 1 or 0 to 1. The former is also known as a Min-Max normalization, and a commonly used Min-Max normalization formula is shown in formula (2):

$$x_{new} = \frac{x_i - x_{min}}{x_{max} - x_{min}} \tag{2}$$

A manner for data scaling used adopted by a scene generation model is the Min-Max normalization. The data form obtained after the above step is shown in formula (2).

The generative adversarial network (GAN) is a deep learning framework that represents a class of generative models. A structure of the GAN model is shown in FIG. 3. Different from a structure of a general neural network, the GAN consists of an adversarial framework composed of two interconnected neural networks. The two networks generally consist of deep networks, one network is called a generative network (also referred as to a generator), which learns an unknown distribution of data samples and expects generated one or more samples to deceive a true/false determination of a discriminative network, and the other network is called the discriminative network (also referred as to a discriminator), which makes a distinction between an input real sample and a generated sample as much as possible.

A training target of the generator is to make a probability distribution $P_G$ of the generated samples $G(z)$ as close as possible to a probability distribution $P_r$ of the real samples x. A training target of the discriminator is to discriminate whether the input is the real samples or the generated samples as correctly as possible, and a discrimination result is fed back in a form of a gradient function to optimize a network structure of the generator and the discriminator.

During the training of these two networks, one network is fixed to update one or more parameters of the other network, and iterates in this way. The discriminative network feeds back the results of its discrimination of the input samples to the generative network, which makes the generative network continuously adjust its parameters to generate more real samples. The discriminative network adapts its parameters to better detect differences in the input samples based on the samples the discriminative network generates. The generative network continuously improves a quality of the generated samples, while the discriminative network continuously improves a discrimination ability. After the adversarial training described above, the generative network eventually captures a latent distribution of the real data, and reaches a Nash equilibrium state, in which the discriminator D is unable to determine whether its inputs are real or generated samples. At this point, it may be regarded that the generator G has learned the probability distribution of the real samples, i.e., both the generated samples G(z) and real samples of generator G follow the probability distribution.

Neither the generator G nor the discriminator D of the GAN is expressed as an explicit function, and there is a great deal of flexibility in a choice of network structure. Symbols involved need to be defined for ease of expression. A distribution pattern of the historical data x is denoted as $P_r$, and a noise variable z is also defined. The noise variable is usually sampled from an already existed simple distribution $P_z$, such as a Gaussian distribution or a uniform distribution.

The generator maps the noise variable z to a generated data space G(z) by up-sampling through a fully connected layer network and a transposed convolution, and a data distribution of the noise variable is noted as $P_G$. As the noise input to the generator is a random variable, whenever a new noise z is input, the corresponding output is also a new variable. The input to the discriminator is the real samples x or the generated samples G(z). The input samples are downsampled by the fully connected layer network, and the discriminator outputs a probability value to descriminate the input samples.

A target of the GAN is to generate real samples so that it is difficult for the discriminative network to distinguish whether the generated samples are real. To achieve this target, a loss function $L_G$ trained by the GN, and a loss function $L_D$ trained by the DN need to be defined. When a fixed DN trains the GN, a probability of the generated samples G(z) may be higher, while the loss function $L_G$ should be smaller. Therefore, the generative network may use the function defined by formula (3):

$$L_G = E_{z \sim P_z}[\log(1 - D(G(z)))] \tag{3}$$

The training target of the discriminative network is to differentiate $P_r$ and $P_G$ as much as possible. When the one or more parameters $\theta_G$ of the generative network are fixed, and the one or more parameters $\theta_D$ of the discriminative network are updated, the greater the difference in discrimination, the stronger a discrimination ability of the DN, i.e., maximizing the difference between $E[D(\cdot)]$ and $E[D(G(\cdot))]$. According to the basic principle of the GAN, when the DN is able to distinguish the input samples well, the loss function $L_D$ is smaller. Thus, the loss function of the discriminative network is defined as formula (4):

$$L_D = -E_{x \sim P_r}[\log D(x)] + E_{z \sim P_z}[\log D(G(z))] \tag{4}$$

A zero-sum game in which the two networks participate is denoted as V(D, G). An optimization of the loss function requires updating according to the other network, while only the one or more parameters of its own network is updated. The two networks are constantly trained alternately, and their parameters are updated independently, until the adversarial network reaches the Nash equilibrium. When the training converges, an optimal pair of parameters $(\theta_D^*; \theta_G^*)$ is obtained. As there are a plurality of poles in a high-dimensional data space, at this time, the parameter $\theta_D^*$ and $\theta_G^*$ are two poles of V(D, G). A principle of the GAN is an optimization problem of a maximum and a minimum, which is defined in formula (5)

$$\min_G \max_D V(D, G) = E_{x \sim P_r}[\log D(x)] - E_{z \sim P_z}[\log(1 - D(G(z)))] \tag{5}$$

where V(D, G) denotes a cross entropy function of binary classification whose ultimate target is to minimize the Jensen-Shannon (JS) divergence between the generated sample probability distribution $P_G$ and the true sample probability distribution $P_G$.

Figure 4:
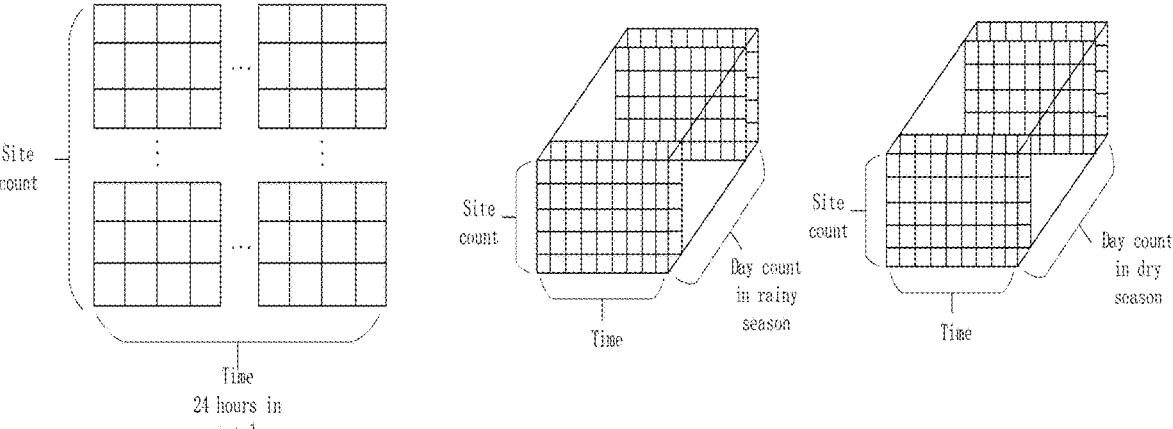
FIG. 4 is a schematic diagram illustrating a form of data inputted into a deep convolutional generative adversarial network according to some embodiments of the present disclosure.
Figure 5:
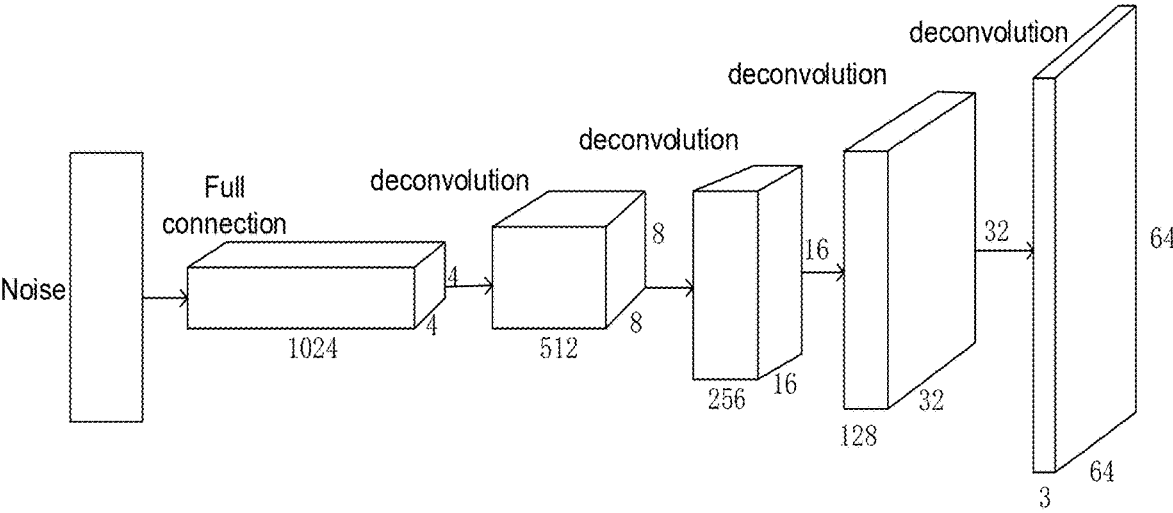
FIG. 5 is a schematic diagram illustrating a structure of a generator model of a deep convolutional generative adversarial network according to the present disclosure.

The DCGAN combines a CNN to enable a processing of images. Network structures of the DCGAN generator model and the discriminator model are shown in FIG. 4 and FIG. 5, respectively.

The DCGAN is structurally modified compared to a traditional GAN, which makes the combination of the GAN and the CNN in the DCGAN more stable. Features of the DCGAN include using a fully convolutional network, eliminating a fully connected layer, and using a batch normalization.

Using the fully convolutional network: using a stride convolution instead of a deterministic spatial pooling function (maxpooling), which allows the network to learn its own spatial downsampling. Using the approach in the generator enables the fully convolutional network to learn its own spatial upsampling and the discriminator.

Eliminating the fully connected layer: the most powerful example is a global average pooling, which is already used in the most advanced image classification model. The global average pooling improves a model stability but impairs a convergence speed. By directly connecting the highest convolutional feature to a middle ground of the inputs and outputs of the generator and the discriminator, respectively, a better effect is achieved. A first layer of the GAN takes a homogeneous noise Z as an input, which is called a full connection. The full connection is just a matrix multiplication, but finally, the first layer of the GAN is recomposed into a 4-dimensional tensor and serves as a start of a convolutional stack. For the discriminator, the last convolutional layer is flattened and fed into a single sigmoid for output.

Using the batch normalization: an input of each unit is transformed to have a zero average value and zero unit variance for a stabilized learning. This manner is proved to be a very important means of accelerating convergence and slowing down overfitting in deep learning. This helps to deal with training problems due to improper initialization and helps a gradient flow through the updated model. It is proved that in this way, the generator is prevented from collapsing all the samples to a single point, which is a common failure mode observed in GANs, which is critical in making the generator to start learning. However, applying batch normalization directly to all layers leads to a sample oscillation and a model instability, so the batch normalization is only used for an output layer of the generator and an input layer of the discriminator.

Step 120, the photovoltaic output scene is generated using the DCGAN.

In some embodiments, after performing the data preprocessing in step 110, the processor uses a randomly sampled noise as the input to the DCGAN generator, and historical output data at each photovoltaic site as a discriminator input. The DCGAN is trained using the training data until the Nash equilibrium is reached. When the DCGAN training is finished, the photovoltaic output scene generated by the generator that is similar to the real data is obtained.

Step 130, a voltage sag domain identification result corresponding to one or more given parameters and a sensitive load threshold is determined based on the photovoltaic output scene, the one or more given parameters, the sensitive load threshold, and one or more structural parameters of an electricity system.

In some embodiments, the one or more given parameters are distribution network parameters of the electricity system or are referred to as given distribution network parameters. The one or more given parameters include, for example, a resistance, a reactance, a conductance, a susceptance, a reactive power, an active power, a generator parameter, a transformer parameter, a transmission line parameter, load parameter, etc.

For an electrical device (a load) in the distribution network, if the voltage changes or sudden changes, and an inability to work normally or a functional degradation is caused, then this kind of electrical device is referred to as a sensitive load, and a short-term reduction in voltage affects a normal operation of the sensitive load, and damages or interruptions in production is likely to occur. In some embodiments, the sensitive load threshold is a value set based on manual experience or actual requirements of the distribution network, and when an operation voltage of the sensitive load is lower than the sensitive load threshold, it indicates that the sensitive load operation is affected.

In some embodiments, the one or more structure parameters of the electricity system are topology parameters of the electricity system.

The voltage sag domain identification result refers to a voltage sag domain of a current photovoltaic output scene, and the voltage sag domain identification result contains one or more fault points corresponding to the sensitive load, which are the electrical devices affected by the voltage and then fail.

In some embodiments, through a preset formula or algorithm, the processor 10 determines the plurality of voltage sag domains based on the photovoltaic output scene, the one or more given parameters, the sensitive load threshold, and the one or more structural parameters of the electricity system, and determines the voltage sag domain identification result based on the plurality of voltage sag domains. More contents of determining the voltage sag domain identification result based on the plurality of voltage sag domains may be found in later descriptions.

Step 140, a voltage reduce response instruction is generated based on the voltage sag domain identification result.

In some embodiments, the voltage reduce response instruction includes instructions for instructing a monitoring frequency, a monitoring accuracy, an upload interval period, and a warning threshold of the electricity monitoring device 30. The processor 10 generates the voltage reduce response instruction for the electricity monitoring device 30 at a position based on the location of the voltage sag domain corresponding to the voltage sag domain identification result. In some embodiments, the electricity monitoring device 30 increases a monitoring intensity of the distribution network based on the voltage reduce response instruction.

In some embodiments, the monitoring frequency refers to a count of times the electricity monitoring device 30 collects relevant electricity parameters within a preset time period (e.g., within 1 minute). The monitoring accuracy refers to an amount of data collected during a single collection by the electricity monitoring device 30. The upload interval period refers to an interval between two adjacent uploads of the collected relevant electricity parameters by an electricity collection device. For example, the voltage reduce response instruction includes instructing the electricity monitoring device 30 to collect the relevant electricity parameters once per second and upload the data to the processor 10 every 30 seconds.

In some embodiments, the warning threshold is a threshold used by the electricity collection device to determine whether a warning is required, which is determined by an expert. For example, when the electricity collection device performs a data collection, if a voltage value in the relevant data collected is less than the warning threshold, there is no need to wait for a next upload period, and the electricity collection device immediately uploads the current data while sending a warning signal to the processor 10 depending on real situation.

Step 150, the voltage reduce response instruction is sent to the electricity monitoring device 30 of the voltage sag domain.

In some embodiments, the processor 10 determines a plurality of electricity monitoring devices 30 within the voltage sag domain based on a position of the distribution network, and sends the voltage reduce response instruction to the plurality of electricity monitoring devices 30.

Referring to FIG. 2, in some embodiments, the plurality of electricity monitoring devices 30 are configured to perform one or more of the following steps after receiving the voltage reduce response instruction.

Step 210, an electricity parameter sequence in the distribution network is collected at the monitoring frequency and with the monitoring accuracy, and the electricity parameter sequence is uploaded to the processor at the upload interval period.

In some embodiments, the related electricity parameters collected by the plurality of electricity monitoring devices 30 construct the electricity parameter sequence in chronological order, with elements of the sequence corresponding to the collected parameter values.

Step 220, whether voltage data in the electricity parameter sequence is below the warning threshold is determined.

In some embodiments, when the voltage data in the electricity parameter sequence falls below the warning threshold, it indicates that the one or more sensitive loads are affected and further processing is required.

Step 230, in response to determining that the voltage data in the electricity parameter sequence is below the warning threshold, the warning signal is sent to the processor;

The warning signal is used to remind affected users (loads) to adjust a power consumption feature of the sensitive loads, e.g., the users are reminded to turn off the sensitive loads, reduce loads of the sensitive loads, etc. More detailed descriptions of the warning threshold may be found in the previous section in step 150.

In some embodiments, to reduce the impact on the sensitive load, the processor 10 is further configured to perform one or more of the following steps after the processor 10 receives the warning signal.

Step 240, an estimated impact load corresponding to a node where the electricity monitoring device 30 is located is determined based on the warning signal.

The estimated impact load refers to one or more sensitive loads that are estimated to be impacted within the voltage sag domain. In some embodiments, the processor 10 determines the node where the electricity monitoring device 30 is located corresponding to the estimated impacted load based on the warning signal in conjunction with a position relation between the electricity monitoring device 30 and the sensitive load in the distribution network. For example, all sensitive loads located on a line within the voltage sag domain are taken as the estimated impact load.

Step 250, a regulation instruction is generated and issued to the regulation hardware 40 corresponding to the estimated impact load to control the regulation hardware 40 to perform a compensation work.

In some embodiments, according to an actual situation of the regulating hardware 40, the regulating instruction includes working parameters or instructions for different devices. The compensation work refers to that the regulation hardware 40 is controlled to work based on the working parameters in the regulating instructions, and thus to compensate for the estimated impact load to reduce the impact on the sensitive loads.

In some embodiments, the regulation hardware 40 includes one or more of a backup electricity supply, a dynamic voltage regulator, and a load switch; and the regulation instruction includes one or more of a backup electricity supply instruction, a voltage self-regulation instruction, and a switch instruction.

The backup electricity supply is configured to: upon receiving the backup electricity supply instruction, provide an electricity supply corresponding to the estimated impact load. The dynamic voltage regulator is configured to: upon receiving the voltage self-regulation instruction, provide a compensating voltage corresponding to the estimated impact load. The load switch is configured to: upon receiving the switch instruction, control the estimated impact load and connection and disconnection of the distribution network.

The estimated impact load within the voltage sag domain is processed accordingly by the regulation hardware 40, so that the sensitive loads continue to function normally or to avoiding voltage fluctuations from damaging the sensitive loads in some cases.

The system for identifying a voltage sag domain generated based on multiple uncertainty scenarios of the present disclosure utilizes the DCGAN for performing a tracking simulation on the photovoltaic output feature, focuses on intrinsic patterns of the distributed photovoltaic output, and exploits a temporal and spatial correlation of the output of multiple distributed photovoltaic units, while accounting for a stochasticity and a correlation of the distributed photovoltaic output, artificial data with the same dimension and similar probability distribution as an original photovoltaic output data is generated.

In some embodiments, the processor 10 is further configured to perform one or more of the following steps.

A voltage at each node of the distribution network before a fault is determined based on the photovoltaic output scene using a Newton-Raphson algorithm;

a current bus is obtained from the line of the distribution network, an impedance matrix of each node of the distribution network is calculated by an additional branch manner or an admittance matrix inversion based on the one or more given parameter, and the voltage sag amplitude of the node where the sensitive load is located when different types of short-circuit faults occur at the nodes on the current bus is determined based on the voltage at each node before the fault and the impedance matrix of each node;

a voltage sag magnitude vector for a bus node is determined based on the voltage sag amplitude of the node where the sensitive load is located when different types of short-circuit faults occur at the nodes on the current bus; a difference vector is obtained based on a comparison between the voltage sag magnitude of the bus node and the sensitive load threshold; a line correlation vector is determined based on the voltage sag amplitude of the node where the sensitive load is located when different types of short-circuit faults occur at the nodes on the current bus;

whether the current bus satisfies an analysis condition based on the line correlation vector is determined;

in response to determine that the current bus does not satisfy the analysis condition, the current bus is not in the voltage sag domain and a next line is selected from the distribution network as the current bus to continue the determination;

in response to determine that the current bus satisfies the analysis condition, then the current bus is analyzed by Newton's quadratic interpolation, a voltage sag amplitude analytical formula and a fault voltage equation for the current bus are obtained; and, a portion of the current bus within the voltage sag domain is obtained based on the fault voltage equation, and the next line is selected from the distribution network as the current bus to continue the determination.

When all the lines of the distribution network are traversed and iterated, a plurality of voltage sag domains corresponding to the one or more given parameters and the sensitive load threshold are obtained, and a concatenation of the plurality of voltage sag domains is the voltage sag domain identification result.

In some embodiments, determining the voltage at each node of the distribution network before the fault is determined based on the photovoltaic output scene using a Newton-Raphson algorithm for load flow calculation includes the following steps.

After the DCGAN generates the photovoltaic output scene, the voltages at each node before the fault are obtained using the Newton-Raphson algorithm for load flow calculation. The Newton-Raphson algorithm is a numerical manner for solving nonlinear formulas efficiently. When solving a load flow calculation problem, the problem is mainly solved by the Newton-Raphson algorithm and a function is linearized step by step by Taylor series. The manner is characterized by fast convergence and small error, and it is a highly efficient manner for solving complex nonlinear formulas. An expression for an n dimensional nonlinear formula is assumed as:

$$
\begin{cases}
f_1(x_1, x_2, \dots x_n) = 0 \\
f_2(x_1, x_2, \dots x_n) = 0 \\
\quad\vdots \\
f_n(x_1, x_2, \dots x_n) = 0
\end{cases} \tag{6}
$$

A linear expansion is performed on a stepwise target function by a first-order Taylor to obtain formula:

$$
\begin{cases}
f\left(x^{(k)}\right) = -J^{(k)}\Delta x^{(k)} \\
x^{(k+1)} = x^{(k)} - \Delta x^{(k)}
\end{cases} \tag{7}
$$

substituting $U_1$ and $Y_{ij}$ into an active power formula and a reactive power formula, a corresponding expression of nonlinear equations in power network is obtained:

$$
\begin{cases}
\Delta P_i = P_i - \sum_{j=1}^{j=n}[e_i(G_{ij}e_j - B_{ij}f_j) + f_i(G_{if}f_j + B_{ij}e_j)] \\
\Delta Q_i = Q_i - \sum_{j=1}^{j=n}[f_i(G_{ij}e_j - B_{ij}f_j) - e_i(G_{if}f_j + B_{ij}e_j)] \\
\qquad \Delta U_i^2 = U_i - \left(e_i^2 + f_i^2\right)
\end{cases} \tag{8}
$$

A modified formula based on the Newton-Raphson algorithm is obtained through further optimization calculation:

12

$$
\begin{bmatrix} \Delta P \\ \Delta Q \\ \Delta x^2 \end{bmatrix} = \begin{bmatrix} \dfrac{\partial \Delta P_i}{\partial f_i} & \dfrac{\partial \Delta P_i}{\partial e_i} \\[2mm] \dfrac{\partial \Delta Q_i}{\partial f_i} & \dfrac{\partial \Delta Q_i}{\partial f_i} \\[2mm] \dfrac{\partial \Delta u_i^2}{\partial f_i} & \dfrac{\partial \Delta u_i^2}{\partial e_i} \end{bmatrix} \begin{bmatrix} \Delta f \\ \Delta e \end{bmatrix} \tag{9}
$$

where, $U_i = e_i + jf_i$ denotes the node voltage; $Y_{ij} = G_{ij} + jB_{ij}$ denotes a node admittance.

Figure 6:
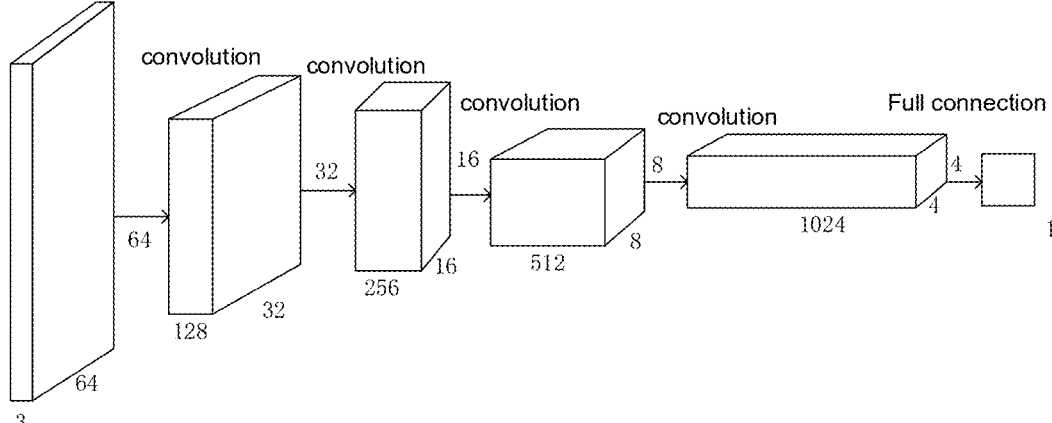
FIG. 6 is a schematic diagram illustrating a structure of a discriminator model of a deep convolutional generative adversarial network according to the present disclosure.

As shown in FIG. 6, the calculation process is as follows:

By substituting the actual data, form an admittance matrix based on clarifying the one or more structural parameters of the electricity system, and an offset of each of the one or more structural parameters is calculated based on given initial values.

In response to that the error satisfies an error precision, a loop is jumped out and a result is output; in response to that the error does not satisfy the error precision, a Jacobi matrix is continued to be solved and a correction voltage is solved by a correction formula, and then the error analysis is performed again. Until a precision requirement is satisfied, the loop ends and the result is output, otherwise the loop process continues.

Figure 7:
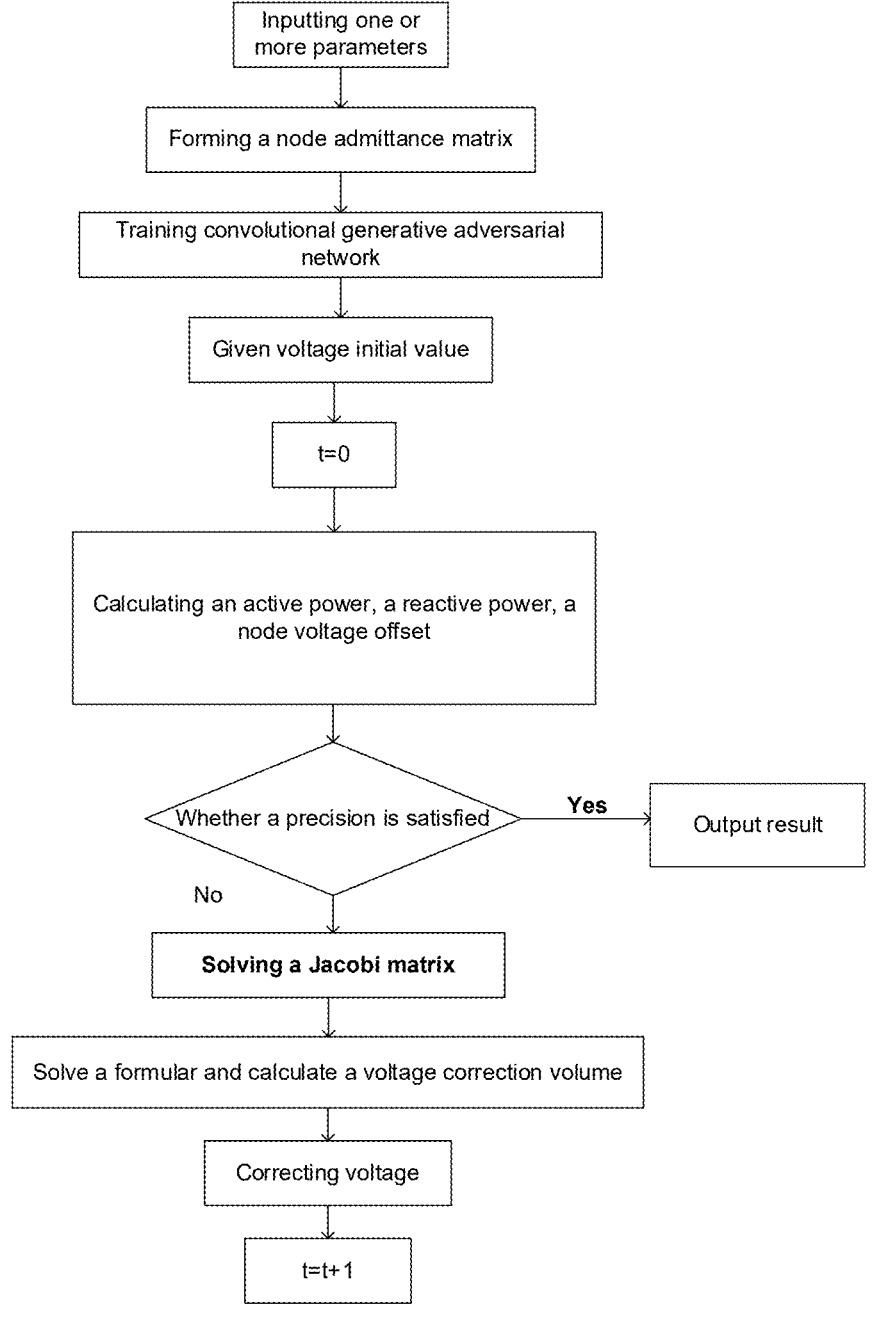
FIG. 7 is a flowchart illustrating a process for Newton-Raphson algorithm for power flow calculation according to the present disclosure.

In some embodiments, the processor 10 is further configured to:

First, an impedance matrix of each node of the distribution network is calculated by an additional branch manner or an admittance matrix inversion based on the one or more given parameters. Next, according to the formulas (11)-(17), the voltage sag amplitude of the node where the sensitive load is located when different types of short-circuit faults occur at the nodes is obtained. As shown in FIG. 7, which is a schematic diagram for calculating the voltage sag amplitude.

In some embodiments, the different types of short-circuit faults includes a three-phase short-circuit fault, a single-phase grounded short-circuit fault, a two-phase short-circuit fault and a two-phase grounded short-circuit fault. It is assumed that there is a fault point K:

When the three-phase short-circuit fault occurs at the fault point K, as it is a symmetrically balanced fault, only a positive sequence is considered, and three-phase voltage sag magnitudes at the sensitive load node S are the same magnitude, the voltage sag magnitude of a particular phase is $$
U_s^f = U_s^{pf} - \left(\frac{Z_{SK}^1}{Z_{KK}^1}\right)U_K^{pf} \tag{10}
$$

where, $$
U_s^f
$$

denotes the voltage sag amplitude at the sensitive load node S;

$$
Z_{KK}^1
$$

13 denotes a positive-sequence self-impedance;

$$Z_{SK}^1$$

denotes a positive-sequence mutual impedance;

$$U_s^{pf}$$

denotes a voltage before fault at the sensitive load node S;

$$U_K^{pf}$$

denotes the voltage before fault at the K point

From the formula (10), it can be seen that the voltage sag amplitude $$U_s^f$$

at the sensitive load node S is related to the one or more structural parameters of the electricity system and an operation state of the electricity system before fault. The operation state before fault refers to whether the distribution network is operating normally or not, which is obtained by calculating a current before fault. When an asymmetrical short-circuit fault whose A phase is a special phase occurs at the fault point K, a symmetrical component manner is used for analysis.

When the single-phase grounded short-circuit fault with occurs at the fault point K with a phase A as a special phase, the voltage sag amplitudes at the sensitive load node S are as follows:

$$
\begin{cases}
U_{A,S}^f = U_{A,S}^{pf} - \dfrac{Z_{SK}^0 + Z_{SK}^1 + Z_{SK}^2}{Z_{KK}^0 + Z_{KK}^1 + Z_{KK}^2} U_K^{pf} \\[2mm]
U_{B,S}^f = \alpha^2 U_{B,S}^{pf} - \dfrac{Z_{SK}^0 + \alpha^2 Z_{SK}^1 + \alpha Z_{SK}^2}{Z_{KK}^0 + Z_{KK}^1 + Z_{KK}^2} U_K^{pf} \\[2mm]
U_{C,S}^f = \alpha U_{C,S}^{pf} - \dfrac{Z_{SK}^0 + \alpha Z_{SK}^1 + \alpha^2 Z_{SK}^2}{Z_{KK}^0 + Z_{KK}^1 + Z_{KK}^S} U_K^{pf}
\end{cases}
\tag{11}
$$

when the two-phase short-circuit fault occurs between the phase B and the phase C, the three-phase voltage sag amplitudes at the sensitive load node S are as follows:

$$
\begin{cases}
U_{A,S}^f = U_{A,S}^{pf} - \dfrac{Z_{SK}^1 - Z_{SK}^2}{Z_{KK}^1 + Z_{KK}^2} U_K^{pf} \\[2mm]
U_{B,S}^f = \alpha^2 U_{B,S}^{pf} - \dfrac{\alpha^2 Z_{SK}^1 - \alpha Z_{SK}^2}{Z_{KK}^1 + Z_{KK}^2} U_K^{pf} \\[2mm]
U_{C,S}^f = \alpha U_{C,S}^{pf} - \dfrac{\alpha Z_{SK}^1 + \alpha^2 Z_{SK}^2}{Z_{KK}^1 + Z_{KK}^S} U_K^{pf}
\end{cases}
\tag{12}
$$

When a two-phase grounded short-circuit fault occurs between the B phase and the C phase, the three-phase voltage sag amplitudes at the sensitive load node S are as follows:

14

$$
U_{A,S}^f = U_{A,S}^{pf} - \frac{(Z_{SK}^1 - Z_{SK}^0)Z_{KK}^2 + (Z_{SK}^1 + Z_{SK}^2)Z_{KK}^0}{Z_{KK}^0 Z_{KK}^1 + Z_{KK}^1 Z_{KK}^2 + Z_{KK}^2 Z_{KK}^0} U_K^{pf}
\tag{13}
$$

$$
U_{B,S}^f = \alpha^2 U_{B,S}^{pf} - \frac{(\alpha^2 Z_{SK}^1 - Z_{SK}^0)Z_{KK} + (\alpha^2 Z_{SK}^1 - \alpha Z_{SK}^2)Z_{KK}^0}{Z_{KK}^0 Z_{KK}^1 + Z_{KK}^1 Z_{KK}^2 + Z_{KK}^2 Z_{KK}^0} U_K^{pf}
$$

$$
U_{C,S}^f = \alpha U_{C,S}^{pf} - \frac{(\alpha Z_{SK}^1 - Z_{SK}^0)Z_{KK}^2 + \alpha Z_{SK}^1 + \alpha^2 Z_{SK})Z_{KK}^0}{Z_{KK}^0 Z_{KK}^1 + Z_{KK}^1 Z_{KK}^2 + Z_{KK}^2 Z_{KK}^0} U_K^{pf}
$$

in formulas (10) to (13), $$U_{A,S}^f,\ U_{B,S}^f,$$

and $$U_{C,S}^f$$

respectively denote the three-phase voltage sag amplitudes at the sensitive load node S;

$$Z_{KK}^i (i = 0, 1, 2)$$

and $$Z_{SK}^i$$

denote the positive sequence self-impedance, a negative sequence self-impedance, a zero sequence self-impedance, and a mutual impedance; and $\alpha = e^{j120°}$ denotes a rotation factor.

When the two-phase grounded short-circuit fault occurs on the bus of the electricity system, the self-impedance and the mutual impedance are directly called from the impedance matrices of each node of the distribution network; however, when the short-circuit fault occurs at a certain point on the line, the self-impedance and the mutual impedance need to be calculated by introducing a position variable p(0≤p≤1) to juggle a node impedance matrix. The sensitive load node S denotes the bus node where the sensitive load is located, and $Z_c$ denotes a sequence impedance of a line F–T. When the fault point K is moving on the line F–T, the three sequence self-impedance $$Z_{KK}^i (i = 0, 1, 2)$$

and the three sequence mutual impedance $$Z_{SK}^i$$

between the fault point K and the sensitive load node S are both expressed by the position impedance matrix Z and the position variable P of the impedance matrix:

$$Z_{KK}^{012} = P^2\left(Z_{FF}^{012} + Z_{TT}^{012} - 2Z_{FT}^{012} - Z_C^{012}\right) + P\left[Z_C^{012} - 2\left(Z_{FF}^{012} - Z_{FT}^{012}\right)\right] + Z_{FF}^{012} \quad (14)$$

$$Z_{SK}^{012} = Z_{SF}^{012} + P\left(Z_{ST}^{012} - Z_{SF}^{012}\right) \tag{15}$$

where, $$Z_{FF}^{012}, Z_{TT}^{012}$$

denote the self-impedances of each sequence of the system bus nodes F and T, respectively;

$$Z_{FT}^{012}, Z_{SF}^{012}$$

and $$Z_{ST}^{012}$$

denote the mutual impedances of each sequence of the system bus nodes F and T, the mutual impedances of each sequence between bus F and sensitive load nodes S, and the mutual impedances of each sequence between bus T and sensitive load nodes S, respectively, all of which may be called from the system node impedance matrix; and $$Z_C^{012}$$

denotes the line sequence impedances between nodes F and T.

In addition, the voltage $$U_K^{pf}$$

at the fault point K before the fault occurs is denoted by the fault position variable P:

$$U_F^{pf} = U_T^{pf} + p\left(U_T^{pf} - U_F^{pf}\right) \tag{16}$$

Therefore, the voltage sag amplitude at the sensitive load node S may therefore be expressed in terms of the pre-fault voltage and the each sequence impedance. Therefore, the voltage sag amplitude at the sensitive load node S is expressed by the voltage before fault and the each sequence impedance. By substituting formulas (14)-(16) into formulas (10)-(13), a function formula U(p) of the voltage sag amplitude at the sensitive load node S related to a the position variable P when any any short-circuit fault occurs at any fault point is obtained.

In some embodiments, determining a line correlation vector based on the voltage sag amplitude of the node where the sensitive load is located when different types of short-circuit faults occur at the nodes on the current bus includes:

From the above, the voltage sag amplitude vector of the node where the sensitive load is located is obtained, and a node determination vector B and a line correlation vector L are calculated according to the formula (12), and all the lines are traversed.

The voltage sag magnitude of the sensitive load node S at the short-circuit fault of each bus is calculated, an n dimensional bus node voltage sag drop magnitude dimension vector $$U_S^f$$

is formed and compared with the sensitive load voltage sag threshold to obtain a difference vector $\Delta U_S$.

$$\Delta U_s = \begin{bmatrix} \Delta U_{S,1} \\ \Delta U_{S,2} \\ \vdots \\ \Delta U_{S,n} \end{bmatrix} = \begin{bmatrix} |U_{S\_1}^f| \\ |U_{S\_2}^f| \\ \vdots \\ |U_{S\_n}^f| \end{bmatrix} - \begin{bmatrix} U_{th} \\ U_{th} \\ \vdots \\ U_{th} \end{bmatrix} \tag{17}$$

By determining a positivity and negativity of elements of $\Delta U_s$ vector, whether the nodes are in the sag domain of the sensitive nodes or not is determined, therefore, the node determination vector B is introduced:

$$B = \begin{bmatrix} B_1 \\ B_2 \\ \vdots \\ B_n \end{bmatrix}, B_i = \begin{cases} 1, \Delta U_{s,i} \le 0 \\ 0, \Delta U_{s,i} > 0 \end{cases} \tag{18}$$

where, $B_i=1$ denotes that the bus i is within the voltage sag domain corresponding to the sensitive load; and $B_i=0$ denotes that the bus i is outside the voltage sag domain corresponding to the sensitive load. Thereby, to determine an inclusion of each line in the sag domain, a line correlation vector L is introduced:

$$L = \begin{bmatrix} L_1 \\ L_2 \\ \vdots \\ L_m \end{bmatrix} = \begin{bmatrix} B_{1\_F} + B_{1\_T} \\ B_{2\_F} + B_{2\_T} \\ \vdots \\ B_{m\_F} + B_{m\_T} \end{bmatrix} \tag{19}$$

where $B_{i\_F}$ and $B_{i\_T}$ denote the bus sag drop determination factor connecting the line.

In some embodiments, based on the line correlation vector, whether the current bus satisfies an analysis condition, and in response to that the current bus does not satisfy the analysis condition, then the current bus is not in the voltage sag domain and a next line is selected from the distribution network as the current bus; in response to that the current bus satisfies the analysis condition, then the current bus is analyzed by Newton's quadratic interpolation, and a voltage sag amplitude analytical formula and a fault voltage equation for the current bus is obtained; and a portion of the current bus within the voltage sag domain is obtained based on the fault voltage equation, and the next line is selected from the distribution network as the current bus to continue the determination.

The analysis condition includes: if $L_i=0$, it indicates that the line is not in the voltage droop domain, the next line is calculated directly; if $L_i=1$, it indicates that one of the first node and the last node of the line is in the voltage sag domain, then it is obtained that the line is partially located in the sag domain, and there is a unique critical point on the line. If $L_i=2$, the first node and the last node of the line are both in the sag domain, then a golden section search manner is used to solve a maximum value $U_{max}$ of a voltage sag amplitude curve, and the maximum value is compared with the sensitive load voltage sag threshold $U_{th}$. If $U_{max}<U_{th}$, it indicates that the line is completely within the sag domain, and there is no critical point, then the next line is directly calculated; if $U_{max}<U_{th}$, it indicates that the line is partially located in the sag domain, and there are two critical points on the line.

Figure 8:
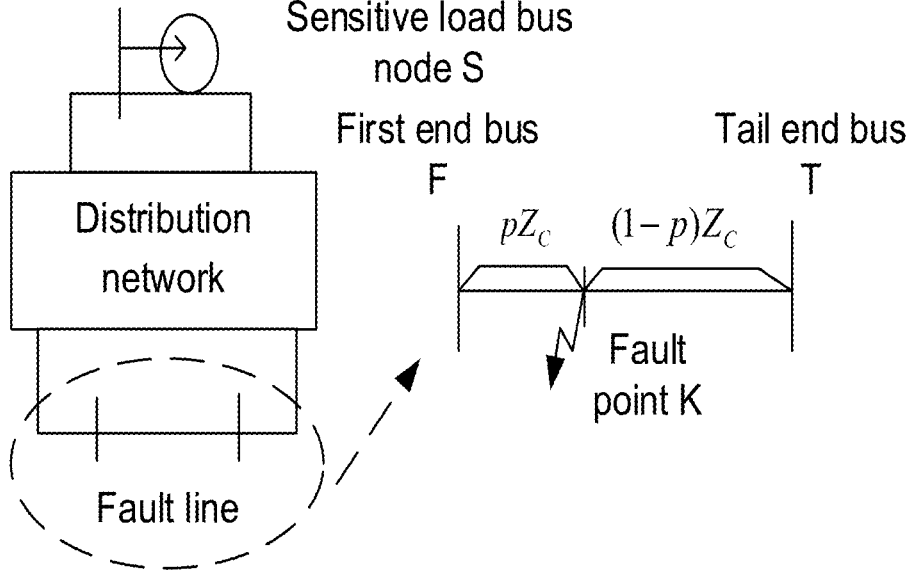
FIG. 8 is a schematic diagram illustrating a process for calculating a voltage sag amplitude according to the present disclosure.
Figure 9:
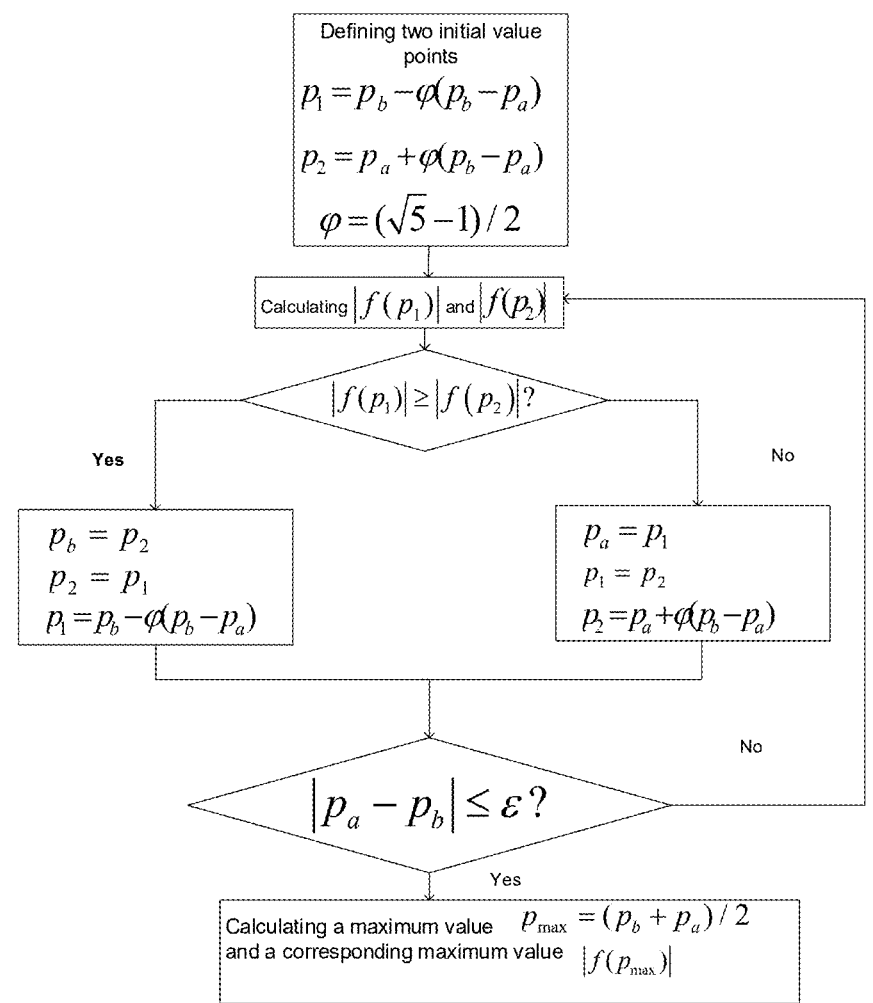
FIG. 9 is a schematic diagram illustrating a process for a golden section search according to the present disclosure.

An entire process of the golden section search manner is to find a point $p_{max}$ in $p_a \leq p \leq p_b$ ($p_a=0$, $p_b=1$) which is able to maximize a sag voltage of a point of common coupling. $p_{max}$ is used as an interpolation point, to ensure that an interpolation curve passes through the maximum point of the voltage sag amplitude, and to provide an initial value point for a positive cut iteration. The process is shown in FIG. 8.

When the current bus satisfies the analysis condition, a critical point is calculated.

The critical point refers to a fault position in the distribution network that causes the voltage sag amplitude at the bus where the sensitive load is located to be equal to the voltage sag threshold of the sensitive load. The calculation of the critical point needs to be performed only on a situation of $L_i=1,2$ in the above analysis condition. When $L_i=1$, (0, $U_F$), (0.5, $U_{0.5}$), and (1, $U_T$) points are directly used as the interpolation point, through the Newton's quadratic interpolation manner to obtain the voltage sag amplitude analytical formula $U_P$ and the fault voltage equation $$U_{th} = ap_i^2 + bp_i + c;$$

when $L_i=2$, (0, $U_F$), ($p_{max}$, $U_{max}$) and (1, $U_T$) points are used as the interpolation point of the Newton's quadratic interpolation manner, to obtain the voltage sag amplitude analytical formula and the fault voltage equation.

A root $p_{ia}$ of the fault voltage equation is taken as an initial iteration value of a positive cut iteration manner. An expression of the iteration performed based on a critical fault distance of the positive cut iteration manner is as follows:

$$P_{k+1} = P_k - \frac{(U(p_k) - U_{th})(p_k - p_{k-1})}{U(p_k) - U(p_{k-1})} \quad (20)$$

A convergence condition is:

$$||U(p_{k+1})| - U_{th}| < \varepsilon \quad (21)$$

The positive cut iteration manner is an algorithm that approximates an exact root, and the positive cut iteration manner is more efficient than the Newton-Raphson algorithm as it does not need to calculate a differential of the formula of the voltage sag amplitude of the sensitive load.

When all the lines of the distribution network are traversed and iterated, obtain a plurality of voltage sag domains corresponding to the one or more given parameters and the sensitive load threshold, and a union of the plurality of voltage sag domains is the voltage sag domain identification result corresponding to the photovoltaic output scene.

In the system for identifying a voltage sag domain generated based on multiple uncertainty scenarios of the present disclosure, based on the short-cut calculation, the quadratic interpolation manner as well as a numerical solution of nonlinear equations are performed, which optimizes the calculation process of the sag domain. By performing classified calculations on different lines, calculation steps are reduced.

Compared with the existing manners for identifying the voltage sag domain, an impact of the dynamic output of the distributed photovoltaic units on the voltage sag feature, as well as the randomness and temporal and spatial correlation of the photovoltaic output itself are considered, which enhances the accuracy of the scenario generation and makes the voltage sag domain of the distributed photovoltaic access more accurately features, thereby improving the accuracy of the voltage sag domain identification.

The processor 10 may also determine the voltage sag domain identification result directly through a machine learning model, and in some embodiments, the processor 10 is further configured to:

construct an electricity feature diagram based on the one or more given parameters, the electricity parameter sequence, the photovoltaic output power information, line base data, a future lighting data, and a sensitive load threshold; by inputting the electricity feature diagram into a voltage sag risk model, obtain a voltage sag risk region; and by calculating a plurality of voltage sag domains within the voltage sag risk region corresponding to the one or more given parameters and the sensitive load threshold, determine the voltage sag domain identification result.

In some embodiments, the line base data refers to a line feature of the distribution network, which is determined by accessing distribution network configuration information. The line base data includes one or more of line physical data, an intersection type, an intersection connection manner, a load type, and a photovoltaic device type. In some embodiments, the future light data includes a light intensity at different times over a time period (e.g., within a day), and the future lighting data is obtained by accessing an external weather database. More descriptions on the one or more given parameters, the electricity parameter sequence, the photovoltaic output power information, and the sensitive load threshold may be found in the preceding related section.

An electricity feature map is a diagram including nodes and edges between the nodes, and in some embodiments, the nodes of the electricity feature map include sensitive load nodes, historical fault nodes, line crossing nodes, and photovoltaic access nodes. The historical fault nodes refer to a position of a circuit where faults historically occurred; the line crossing nodes refer to nodes at the intersection of the bus and branch lines in the power distribution network.

In some embodiments, attributes of the nodes in the electricity feature map include one or more electricity parameters, a historical fault record, and regional environmental data.

The one or more electricity parameters refer to voltages and currents, etc. for the node in history. The one or more electricity parameters are obtained based on the electricity parameter sequence of the node.

The historical fault record includes a fault cause, a fault type, and a fault time, etc. The historical fault record is obtained by reading an operation database. If no fault ever occurs to the node, the historical fault record is empty.

The regional environmental data refers to environmental data of a region where the node is located, the regional environmental data includes a temperature, a precipitation, etc., which is obtained by a sensor or by accessing the external weather database.

In some embodiments, according to different node types, the nodes in the electricity feature map also contain additional node attributes.

In some embodiments, when the node is the sensitive load node, the node attributes also include: a load type, a historical voltage sag record, and the sensitive load threshold.

The load type indicates a type of a specific load connected to the node (e.g., the electric device is a numerical control machine tool, a server, or an X-ray machine, etc.), and the load type is obtained by accessing the database.

The historical voltage sag record refers to a record of voltage sag corresponding to a performance degradation or failure of a sensitive load device. The historical voltage sag record includes a sag cause, a sag magnitude, a sag duration, and a sag time, etc., and the historical voltage sag record is obtained by accessing the operation database.

In some embodiments, when the node is the line crossing node, the node attributes also include: the intersection type (e.g., a T-type, a cross-type), an intersection connection manner (e.g., a direct connection, a connection through a switchgear or a transformer), and one or more sub-transmission electricity parameters. The intersection type and the intersection connection manner are obtained by accessing a database, and the one or more sub-transmission electricity parameters include information such as a voltage, a current, and other information corresponding to the upstream and downstream lines, which are obtained through the electricity parameter sequence.

In some embodiments, when the node is a photovoltaic access node, the node attributes include: the photovoltaic output power information, historical lighting data, a photovoltaic device type, the future lighting data. Similar to the future lighting data, the historical lighting data is obtained by accessing the external weather database.

In some embodiments, the edges of the electricity feature map correspond to electricity lines between the nodes, and in some embodiments, the edges of the electricity feature map have directions that are consistent with the directions of the currents in the electricity lines. The attributes of the edges in the centricity feature map include the line physical data (e.g., a length, a cross-section, a material, etc. of the electrical line) and one or more line electricity parameters in the one or more electricity parameters. The line physical data and the electricity parameters are obtained by accessing the database.

In some embodiments, the voltage sag risk model is a graph neural networks (GNN) model, which is trained by training data. An input to the voltage sag risk model is the electricity feature map, and an output of the model is the voltage sag risk region.

In some embodiments, the voltage sag risk model is obtained by training a plurality of labeled training data. Specifically, the plurality of labeled training data is input to the voltage sag risk model, a loss function is constructed from the labels and a result of an initial voltage sag risk model, and parameters of the initial voltage sag risk model are iteratively updated based on the loss function by gradient descent or other manners. The model training is completed when a preset condition is satisfied, and a trained voltage sag risk model is obtained. The preset condition may be that the loss function converges, a count of iterations reaches a threshold, etc.

In some embodiments, the training samples include a sample centricity feature map based on one or more sample given parameters, a sample electricity parameter sequence, sample photovoltaic output power information, sample line base data, sample future lighting data and a sample sensitive load threshold. The sample power feature map is similar to the electricity feature map, which is a map composed of nodes and edges between nodes, and the nodes of the sample electricity feature map include sample sensitive load nodes, sample historical fault nodes, sample line crossing nodes, and sample photovoltaic access nodes. The edges of the sample power feature map are the edges between the sample nodes.

In some embodiments, labels corresponding to the training samples are regions of the voltage sag domain corresponding to the sample sensitive loads, and the labels are determined based on an actual scene corresponding to the sample electricity feature map or determined by software simulation.

In some embodiments, when the voltage sag risk model outputs the voltage sag risk region, the processor 10 determines whether the bus within the voltage sag risk region satisfies the analysis condition based on the manner described above, obtains a plurality of voltage sag domains, and thereby obtaining the voltage sag domain identification result.

Determining the voltage sag risk region with relatively high voltage sag risk by the voltage sag risk model eliminates a need for the processor 10 to traverse an entirety of the lines in the distribution network, which greatly improves a speed of determining the voltage sag domain identification result, and improves the response rate of the system.

In some embodiments, the processor 10 is further configured to: determine the sensitive load threshold based on a load type, a load aging degree, and one or more load rating parameters of the sensitive load. In some embodiments, the load aging degree is indicated by a cumulative working hours of the sensitive load, and the load type and the one or more load rating parameters are determined by accessing the database.

In some embodiments, the processor 10 constructs a sensitive load feature vector based on the load type, the load aging degree, and the one or more load rating parameters of the sensitive load, and the load type, the load aging degree, and the one or more load rating parameters each correspond to a dimension of the sensitive load feature vector. In some embodiments, the sensitive load feature vector also includes other dimensions, such as a dimension corresponding to a current working temperature of the load.

In some embodiments, the processor 10 determines the sensitivity load threshold based on a vector matching of the sensitive load feature vectors in a vector database. The vector database is obtained by constructing a plurality of groups of reference sensitive feature vectors as well as corresponding reference sensitive load thresholds. The processor 10 matches the sensitive load feature vectors to reference sensitive feature vectors based on the sensitive load feature vectors, and takes the reference sensitive load thresholds corresponding to the reference sensitive feature vectors as the sensitive load thresholds.

In some embodiments, the vector matching is performed by selecting the reference sensitive feature vector with the least vector distance (e.g., a Euclidean distance or a cosine distance, etc.) as the reference sensitive feature vector for match, and in some embodiments, other vector matching manners, such as a fast similarity search, etc. are adopted.

In some embodiments, the plurality of groups of reference sensitive feature vectors in the vector database and the corresponding reference sensitive load thresholds are obtained in the following manner: first, experiments are conducted on the reference sensitive loads and their sensitive load types, load aging degrees, and one or more load rating parameters are recorded to construct the reference sensitive feature vectors; then, experiments are performed on the reference sensitive loads with different sizes of voltage sags, and the sensitive load thresholds corresponding to the loads are recorded. Exemplarily, assuming that a rated voltage of the reference sensitive load is 220V, a working voltage of the reference sensitive load is gradually reduced, such as down to 219V, 218V, etc. for the experiments, and if the sensitive load is found unable to work normally (or any abnormity occurs) when the voltage is lower than 215V, then the reference sensitive load threshold is 215V.

By constructing the vector database, factors such as the sensitive load type and the load aging degree are considered, and the sensitive load thresholds are more easily and accurately determined.

To obtain the voltage sag risk model with a better performance and to improve a learning effect from the training data, in some embodiments, the processor 10 trains the voltage sag risk model using a two-stage training manner.

In some embodiments, the training process of the voltage sag risk model includes an initial training phase and an intensive training phase performed separately using the training data. The training data used in the initial training phase and the intensive training phase are the same as those used in the preceding text, i.e., the training data includes the training samples and the labels corresponding to the training samples; the training samples include a sample electricity feature map constructed based on the one or more sample given parameters, the sample electricity parameter sequence, the sample future lighting data, and the sample sensitive load data. The labels corresponding to the training samples are the regions of the voltage sag domain corresponding to the sample sensitive loads.

A difference between the training data used in the initial training phase and the intensive training phase is that the data sources used to construct the training data are different. In some embodiments, the initial training phase is performed by constructing the training data based on a generalized dataset obtained from a cloud platform; and the intensive training phase is performed by constructing the training data based on data actually collected from the distribution network.

The training data used in the initial training phase comes from the cloud platform, which contains several data sets of the distribution networks under different scenes, scales, weather conditions, etc., so that the processor 10 is able to quickly and massively obtain the training data used in the initial training data used in the initial training phase, and at the same time make the model obtained from the training have a good generalization ability, which is able to better identify and deal with the voltage sag risk.

The training data used in the intensive training phase comes from the actual data collected by the electrical distribution network, which makes the data used in training closer to the actual application scene, and improves a performance of the model in real applications.

In some embodiments, sample sizes corresponding to the distribution network of different complexity levels in the training data of the initial training phase is not less than a preset threshold. The preset threshold is determined based on the complexity level of the corresponding electricity grid. In some embodiments, the preset threshold is positively correlated to the complexity level of the electrical grid.

In some embodiments, the electrical grid of higher complexity level correspond to a greater sample count (e.g., correspond to data collected within 10 days of the electrical grid), and the electrical grid of lower complexity level correspond to a smaller sample count (e.g., correspond to data collected within 3 days of the electrical grid), so as to allow the model to have more samples for learning for the more complex distribution network during the initial training phase, and to ensure the generalization ability of the model.

In some embodiments, the complexity level of the electrical grid is determined based on the topology of the electrical grid itself, the complexity level of the device accessing to the electrical grid, and the complexity level of a weather in the region where the electrical grid is located. In some embodiments, the complexity level of the electrical grid is determined based on a weighted sum of the topology of the electrical grid itself, the complexity level of the device accessing to the electrical grid, and the complexity level of the weather of the region where the electrical grid is located, and a weight is determined according to the actual situation to reflect the importance of a certain factor.

In some embodiments, the greater a count of devices connected to the electrical grid and the greater a type of the devices connected to the electrical grid, the greater the complexity level of the devices. In some embodiments, the weather complexity level is expressed using an average value of a variance of a temperature, a precipitation, a light, etc. over time (e.g., over 1 day).

In some embodiments, the topology of the electrical grid itself is obtained by first abstracting an electrical grid structure into a map. The map includes nodes and edges. The nodes correspond to connection points, cross-connections between each wire; and the edges are the wires themselves. Topological metrics such as a ring count, a node count, an edge count, a network density, and a node degree distribution in the graph are then calculated, which in turn determines the topological complexity degree of the electrical grid.

In some embodiments, the ring count is calculated using a ring detection algorithm in a graph theory. The network density is obtained by calculating a ratio of the edge count in the graph to a maximized edge count (assuming that there are edges between each two nodes), and the node degree distribution is calculated using a degree distribution algorithm in the graph theory. In some embodiments, the higher the ring count, the higher the node count and the edge count, the higher the network density, the higher an average clustering coefficient, and the higher the complexity level.

By using the two-stage training to train the voltage sag risk model, a great amount of training data used in the initial training phase is obtained, and at the same time, the trained model has a good generalization ability, which is able to better identify and deal with the voltage sag risk. Moreover, by using the actual data to perform the intensive training helps to improve the performance of the model in actual applications.

To make the photovoltaic output scene generated by the DCGAN more robust, in some embodiments, the processor 10 is further configured to: generate a plurality of sets of randomly sampled noises with different noise features as well as training subsets thereof based on preprocessed photovoltaic output data. The noise feature reflects distribution information of the photovoltaic output. The processor further trains the DCGAN based on the plurality of sets of randomly sampled noises and their corresponding training subsets.

In some embodiments, the processor 10 divides the photovoltaic output power information preprocessed by step 110 to generate the randomly sampled noises with different noise features. In some embodiments, the processor 10 divides the photovoltaic output power information by seasons and/or divides the photovoltaic output power information by lighting intensities to better reflect a change pattern of the photovoltaic output power in different seasons or under different lighting conditions.

In some embodiments, the processor 10 employs a non-parametric manner (e.g., a kernel density estimation, an empirical cumulative distribution function, a Copula model) to generate a plurality of sets of randomly sampled noises with different noise features based on the photovoltaic output power information divided by season and/or by lighting intensity.

In some embodiments, when training the DCGAN using the aforementioned plurality of sets of randomly sampled noises with different noise features and their corresponding training subsets, a hybrid training based on the training subsets or an independent training based on the training subsets is performed according to actual needs.

In the hybrid training based on the training subsets, i.e., a training subset (or a batch of the training subsets) is randomly selected from the plurality of subsets in each iteration of the DCGAN for training to ensure that the generator and the discriminator are exposed to data from different subsets in the training process, so as to learn a wider range of the photovoltaic output patterns, and enable the generator to be exposed to a wider range of data distributions, thus learning about a diversity and an uncertainty of the photovoltaic output.

In the independent training based on the subsets, i.e., a plurality of sub-models corresponding to different seasons or lighting intensities, are separately obtained after training is completed, and in some embodiments, the processor 10 fuses the plurality of sub-models to obtain a comprehensive DCGAN. The independent training enables the generator for each subset to focus on learning distribution features specific to that subset, and such targeted training helps to generate a more realistic photovoltaic output scene, which is particularly suitable for applications with high requirements on specific environmental conditions.

While embodiments of the present disclosure have been shown and described, it is appreciated by those skilled in the art that a wide variety of equivalent variations, modifications, replacements, and deformations may be made to these embodiments without departing from the principle and spirit of the present disclosure, and the scope of the present disclosure is limited by the appended claims and their equivalent scopes.

What is claimed is:

1. A system for identifying a voltage sag domain generated based on multiple uncertainty scenarios, wherein the system includes a processor, at least one photovoltaic monitoring device, an electricity monitoring device, and a regulation hardware;

the processor is configured to:

collect photovoltaic output power information of each photovoltaic site based on the photovoltaic monitoring device deployed at each photovoltaic site on a distribution network, and train a deep convolutional generative adversarial network based on the photovoltaic output power information;

generate a photovoltaic output scene using the deep convolutional generative adversarial network;

determine, based on the photovoltaic output scene, one or more given parameters, a sensitive load threshold, and one or more structural parameters of an electricity system, a voltage sag domain identification result corresponding to the one or more given parameters and the sensitive load threshold;

determine a voltage at each node of the distribution network before a fault based on the photovoltaic output scene using a Newton-Raphson algorithm;

obtain a current bus from a line of the distribution network, calculate an impedance matrix of each node of the distribution network by an additional branch manner or an admittance matrix inversion based on the one or more given parameters, and determine a voltage sag amplitude of a node where a sensitive load is located when different types of short-circuit faults occur at nodes on the current bus based on the voltage at each node before the fault and the impedance matrix of each node;

determine a voltage sag magnitude vector for a bus node based on the voltage sag amplitude of the node where the sensitive load is located when the different types of short-circuit faults occur at the nodes on the current bus;

obtain a difference vector by comparing the voltage sag magnitude vector of the bus node with the sensitive load threshold; and determine a line correlation vector based on the difference vector;

perform a judgment to determine whether the current bus satisfies an analysis condition based on the line correlation vector;

in response to determine that the current bus does not satisfy the analysis condition, determine that the current bus is not in the voltage sag domain and select a next line from the distribution network as the current bus to continue the judgment; or in response to determine that the current bus satisfies the analysis condition, obtain, by analyzing the current bus using a Newton quadratic interpolation algorithm, a voltage sag amplitude analytical formula and a fault voltage equation for the current bus; and obtain a portion of the current bus within the voltage sag domain based on the fault voltage equation, and select a next line from the distribution network as the current bus to continue the judgment; and when all lines of the distribution network are traversed and iterated, obtain a plurality of voltage sag domains corresponding to the one or more given parameters and the sensitive load threshold, wherein a concatenation of the plurality of voltage sag domains is the voltage sag domain identification result;

generate a voltage reduce response instruction based on the voltage sag domain identification result; the voltage reduce response instruction including a monitoring frequency, a monitoring accuracy, an upload interval period, and a warning threshold for indicating the electricity monitoring device;

send the voltage reduce response instruction to the electricity monitoring device of the voltage sag domain;

the electricity monitoring device is configured to:

collect an electricity parameter sequence in the distribution network at the monitoring frequency and with the monitoring accuracy, and upload the electricity parameter sequence to the processor at the upload interval period;

25 determine whether voltage data in the electricity parameter sequence is below the warning threshold; and in response to determining that the voltage data in the electricity parameter sequence is below the warning threshold, send a warning signal to the processor; and the processor is further configured to:

determine an estimated impact load corresponding to a node where the electricity monitoring device is located based on the warning signal; and generate a regulation instruction and issue the regulation instruction to regulation hardware corresponding to the estimated impact load to control the regulation hardware to perform a compensation work.

2. The system of claim 1, wherein a property of the deep convolutional generative adversarial network includes: using a fully convolutional network, eliminating a fully connected layer, and using a batch normalization; and the processor is further configured to:

after preprocessing the photovoltaic output power information, designate a random sampling noise as an input of a generator of the deep convolutional generative adversarial network, designate historical output power data of the each photovoltaic site as an input of a discriminator of the deep convolutional generative adversarial network, and train the deep convolutional generative adversarial network using training data until a Nash equilibrium is reached; and when the training of the deep convolutional generative adversarial network is completed, obtain a photovoltaic output scene generated by the generator that is similar to real data.

3. The system of claim 1, wherein the processor is further configured to:

by substituting actual data, form the admittance matrix based on clarifying the one or more structural parameters of the electricity system, and calculate an offset of each of the one or more structural parameters based on given initial values; and perform an error analysis, and in response to determining that an error satisfies an error precision, jump out of a loop and output a result; in response to determining that the error does not satisfy the error precision, continue to solve a Jacobi matrix and solve for a correction voltage by a correction equation, and then perform the error analysis again.

4. The system of claim 1, wherein the different types of short-circuit faults include a three-phase short-circuit fault, a single-phase grounded short-circuit fault, a two-phase short-circuit fault, and a two-phase grounded short-circuit fault;

when the short-circuit fault is the three-phase short-circuit fault, the processor is configured to:

when the three-phase short-circuit fault occurs at a fault point K, which indicates that the short-circuit fault is a symmetrically balanced fault, consider only a positive sequence, wherein three-phase voltage sag magnitudes at a sensitive load node S are the same magnitude, one of the three-phase voltage sag magnitudes is:

$$U_s^f = U_s^{pf} - \left( \frac{Z_{SK}^1}{Z_{KK}^1} \right) U_K^{pf}$$

26 where, $$U_s^f$$

denotes the voltage sag amplitude at the sensitive load node S, $$Z_{KK}^1$$

denotes a positive sequence self-impedance, $$Z_{SK}^1$$

denotes a positive sequence mutual impedance, $$U_s^{pf}$$

denotes a voltage before fault at the sensitive load node S, $$U_K^{pf}$$

denotes a voltage before fault at the fault point K; the voltage sag amplitude $$U_s^f$$

at the fault point node S is related to the one or more structural parameters of the electricity system and an operation state of the electricity system before fault, and when an asymmetrical short-circuit fault whose phase is a special phase occurs at the fault point K, a symmetrical component manner is used for analysis;

when the short-circuit fault is the single-phase grounded short-circuit fault, the processor is configured to:

when the single-phase grounded short-circuit fault occurs at the fault point K with a phase A as a special phase, determine the three-phase voltage sag amplitudes at the sensitive load node S as follows:

$$\begin{cases} U_{A,S}^f = U_{A,S}^{pf} - \dfrac{Z_{SK}^0 + Z_{SK}^1 + Z_{SK}^2}{Z_{KK}^0 + Z_{KK}^1 + Z_{KK}^2} U_K^{pf} \\ U_{B,S}^f = \alpha^2 U_{B,S}^{pf} - \dfrac{Z_{SK}^0 + \alpha^2 Z_{SK}^1 + \alpha Z_{SK}^2}{Z_{KK}^0 + Z_{KK}^1 + Z_{KK}^2} U_K^{pf} \\ U_{C,S}^f = \alpha U_{C,S}^{pf} - \dfrac{Z_{SK}^0 + \alpha Z_{SK}^1 + \alpha^2 Z_{SK}^2}{Z_{KK}^0 + Z_{KK}^1 + Z_{KK}^S} U_K^{pf} \end{cases}$$

where $$U_{A,S}^f$$

denotes an A phase voltage sag amplitude at the sensitive load node $$U_{B,S}^f$$

denotes a B phase voltage sag amplitude at the sensitive load node S, $$U_{C,S}^f$$

denotes a C phase voltage sag amplitude at the sensitive load node S; and $$U_{A,S}^{pf}$$

denotes an A phase voltage before fault at the sensitive load node S, $$U_{B,S}^{pf}$$

denotes a B phase voltage before fault at the sensitive load node S, $$U_{C,S}^{pf}$$

denotes a C phase voltage before fault at the sensitive load node S;

$$Z_{KK}^0$$

denotes a zero sequence self-impedance at the fault point K, $$Z_{KK}^1$$

denotes a positive sequence self-impedance at the fault point K, $$Z_{KK}^2$$

denotes a negative sequence self-impedance at the fault point K;

$$Z_{SK}^0$$

denotes a zero sequence mutual impedance between the sensitive load node S and the fault point K, $$Z_{SK}^1$$

denotes a positive sequence mutual impedance between the sensitive load node S and the fault point K, $$Z_{SK}^3$$

denotes a negative sequence mutual impedance between the sensitive load node S and the fault point K;

$$U_K^{pf}$$

denotes the voltage before fault at the fault point K; α denotes a rotation factor, $\alpha = e^{j120°}$;
  when the short-circuit fault is the two-phase short-circuit fault, the processor is configured to:
  when the two-phase short-circuit fault occurs between the B phase and the C phase, determine the three-phase voltage sag amplitudes at the point as:

$$\begin{cases} U_{A,S}^f = U_{A,S}^{pf} - \dfrac{Z_{SK}^1 - Z_{SK}^2}{Z_{KK}^1 + Z_{KK}^2} U_K^{pf} \\ U_{B,S}^f = \alpha^2 U_{B,S}^{pf} - \dfrac{\alpha^2 Z_{SK}^1 - \alpha Z_{SK}^2}{Z_{KK}^1 + Z_{KK}^2} U_K^{pf} \\ U_{C,S}^f = \alpha U_{C,S}^{pf} - \dfrac{\alpha Z_{SK}^1 + \alpha^2 Z_{SK}^2}{Z_{KK}^1 + Z_{KK}^S} U_K^{pf} \end{cases}$$

when the short-circuit fault is the two-phase grounded short-circuit fault, the processor is configured to:
  when the two-phase grounded short-circuit fault occurs between the B phase and the C phase, determine the three-phase voltage sag amplitudes at the sensitive load node S as follows:

$$U_{A,S}^f = U_{A,S}^{pf} - \frac{(Z_{SK}^1 - Z_{SK}^0)Z_{KK}^2 + (Z_{SK}^1 + Z_{SK}^2)Z_{KK}^0}{Z_{KK}^0 Z_{KK}^1 + Z_{KK}^1 Z_{KK}^2 + Z_{KK}^2 Z_{KK}^0} U_K^{pf}$$

$$U_{B,S}^f = \alpha^2 U_{B,S}^{pf} - \frac{(\alpha^2 Z_{SK}^1 - Z_{SK}^0)Z_{KK} + (\alpha^2 Z_{SK}^1 - \alpha Z_{SK}^2)Z_{KK}^0}{Z_{KK}^0 Z_{KK}^1 + Z_{KK}^1 Z_{KK}^2 + Z_{KK}^2 Z_{KK}^0} U_K^{pf}$$

$$U_{C,S}^f = \alpha U_{C,S}^{pf} - \frac{(\alpha Z_{SK}^1 - Z_{SK}^0)Z_{KK}^2 + \alpha Z_{SK}^1 + \alpha^2 Z_{SK})Z_{KK}^0}{Z_{KK}^0 Z_{KK}^1 + Z_{KK}^1 Z_{KK}^2 + Z_{KK}^2 Z_{KK}^0} U_K^{pf}$$

when the two-phase grounded short-circuit fault occurs on the bus of the electricity system, directly call self-impedances and mutual impedances from an impedance matrix of each node of the distribution network; however, when the short-circuit fault occurs at a certain point on the line, calculate the self-impedances and the mutual impedances by introducing a position variable p(0≤p≤1) to juggle a node impedance matrix, wherein the sensitive load node S denotes a bus node where the sensitive load is located, $Z_C$ denotes a sequence impedance of a line F–T, when the fault point K is moving on the line F–T, three sequence self-impedance $$Z_{KK}^i (i = 0, 1, 2)$$

and three sequence mutual impedance $$Z_{SK}^i$$

between the fault point K and the sensitive load node S are both expressed by the position variable p of the impedance matrix Z:

$$Z_{KK}^{012} = p^2\left(Z_{FF}^{012} + Z_{TT}^{012} - 2Z_{FT}^{012} - Z_C^{012}\right) + p\left[Z_C^{012} - 2\left(Z_{FF}^{012} - Z_{FT}^{012}\right)\right] + Z_{FF}^{012}$$

$$Z_{SK}^{012} = Z_{SF}^{012} + p\left(Z_{ST}^{012} - Z_{SF}^{012}\right)$$

where, $$Z_{FF}^{012}$$

and $$Z_{TT}^{012}$$

respectively denote the zero sequence self-impedance, the positive sequence self-impedance, and the negative sequence self-impedance of system bus nodes F and T, $$T, Z_{FT}^{012}, Z_{SF}^{012},$$

and $$Z_{ST}^{012}$$

respectively denote a sequence mutual impedance of the system bus nodes F and T, a sequence mutual impedance between the bus node F and the sensitive load node S, a sequence mutual impedance between the bus node T and the sensitive load node S, which are all called from the impedance matrix of each node of the distribution network, $$Z_C^{012}$$

denotes a line sequence impedance between the nodes F and T, and p(0≤p≤1) denotes a position variable of the fault point K on the line F–T;

a voltage $$U_K^{pf}$$

at the fault point K before fault is represented by a fault position variable p:

$$U_F^{pf} = U_T^{pf} + p\left(U_T^{pf} - U_F^{pf}\right)$$

where, $$U_F^{pf}$$

denotes the voltage at the bus node F before fault, $$U_T^{pf}$$

denotes the voltage at the bus node T before fault, p(0≤p≤1) denotes the position variable of the fault point K on the line F–T; the voltage sag amplitude at the sensitive load node S is expressed by the voltage before fault and the each sequence impedance, to obtain a function expression U(p) of the voltage sag amplitude at the sensitive load node S related to the position variable p when any short-circuit fault occurs at any fault point.

5. The system of claim 1, wherein an expression of the difference vector is:

$$\Delta U_s = \begin{bmatrix} \Delta U_{S,1} \\ \Delta U_{S,2} \\ \vdots \\ \Delta U_{S,n} \end{bmatrix} = \begin{bmatrix} \left|U_{S\_1}^f\right| \\ \left|U_{S\_2}^f\right| \\ \vdots \\ \left|U_{S\_n}^f\right| \end{bmatrix} - \begin{bmatrix} U_{th} \\ U_{th} \\ \vdots \\ U_{th} \end{bmatrix}$$

where, $$\left|U_{S\_1}^f\right|$$

denotes an absolute value of a voltage amplitude at the sensitive load node S when the short-circuit fault occurs in a bus 1, $$\left|U_{S\_2}^f\right|$$

denotes an absolute value of a voltage amplitude at the sensitive load node S is located when the short-circuit fault occurs in a bus 2, $$\left|U_{S\_n}^f\right|$$

denotes an absolute value of a voltage amplitude at the node S of where the sensitive load is located when the short-circuit fault occurs in a bus n, and $U_{th}$ denotes a sensitive load voltage sag threshold; $\Delta U_{S,1}$ denotes a difference between the absolute value of the voltage amplitude at the node S of where the sensitive load is located when the short-circuit fault occurs in the bus 1 and the sensitive load voltage sag threshold, $\Delta U_{S,1}$ denotes a difference between the absolute value of the voltage amplitude at the node S of where the sensitive load is located when the short-circuit fault occurs in the bus 2 and the sensitive load voltage sag threshold; $\Delta U_{S,n}$ denotes a difference between the absolute value of the voltage amplitude at the node S of where the sensitive load is located when the short-circuit fault occurs in the bus n and the sensitive load voltage sag threshold and, $\Delta U_S$ denotes the difference vector formed by $\Delta U_{S,1}$, $\Delta U_{S,2}$, and $\Delta U_{S,n}$;

by determining positive and negative of elements in the difference vector $\Delta U_S$, whether the each node of the distribution network is within a voltage sag domain of the sensitive node is obtained, and a determination vector B of the node is introduced:

$$B = \begin{bmatrix} B_1 \\ B_2 \\ \vdots \\ B_n \end{bmatrix}, B_i = \begin{cases} 1, \Delta U_{s,i} \le 0 \\ 0, \Delta U_{s,i} > 0 \end{cases}$$

where, $B_1$ denotes a determination result of the bus 1, $B_2$ denotes a determination result of the bus 2, Bn denotes a determination result of bus n, $B_i$ denotes the determination result of a bus i, and B denotes the node determination vector; $\Delta U_{S,i}$ denotes a difference between the absolute value of the voltage amplitude at the node S of where the sensitive load is located when the short-circuit fault occurs in the bus i and the sensitive load voltage sag threshold;

$B_i=1$ indicates that the bus i is within the voltage sag domain corresponding to the sensitive load; $B_i=0$ indicates that the bus i is outside the voltage sag domain corresponding to the sensitive load, and an inclusion situation of each line in the voltage sag domain is determined by introducing a line correlation vector L:

$$L = \begin{bmatrix} L_1 \\ L_2 \\ \vdots \\ L_m \end{bmatrix} = \begin{bmatrix} B_{1\_F} + B_{1\_T} \\ B_{2\_F} + B_{2\_T} \\ \vdots \\ B_{m\_F} + B_{m\_T} \end{bmatrix}$$

where, L denotes the line correlation vector, $L_1$ denotes a determination result of the inclusion situation where a line 1 is included in the sag domain, $L_2$ denotes a determination result of the inclusion situation where a line 2 is included in the sag domain, and $L_m$ denotes a determination result of the inclusion situation where a line m is included in the sag domain; $B_{1\_F}$ denotes a sag domain determination result of the bus node F of the line 1, $B_{1\_T}$ denotes a sag domain determination result of the bus node T of the line 1, $B_{2\_T}$ denotes the sag domain determination result of the bus node T of the line 2, $B_{m\_F}$ denotes the sag domain determination result of the bus node F of the line m, and $B_{m\_T}$ denotes the sag domain determination result of the bus node T of the line m;

the perform a judgment to determine whether the current bus satisfies an analysis condition based on the line correlation vector, includes that:

if $L_i=0$, it indicates that the line is not in the voltage sag domain, a next line is calculated directly; if $L_i=1$, it indicates that one of a first node and a last node of the line is in the voltage sag domain, then it is obtained that the line is partially located in the sag domain, and there is a unique critical point on the line; if $L_i=2$, it indicates that the first node and the last node of the line are both in the sag domain, a golden section search manner is used to solve a maximum value $U_{max}$ of a voltage sag amplitude curve, and the maximum value $U_{max}$ is compared with the sensitive load voltage sag threshold $U_{th}$; if $U_{max}<U_{th}$, it indicates that the line is completely within the sag domain, and there is no critical point, then the next line is directly calculated; if $U_{max}\ge U_{th}$, it indicates that the line i is partially located in the sag domain, and there are two critical points on the line;

an entire process of the golden section search manner includes: finding a point $P_{max}$ in $p_a \le p < p_b(p_a=0,p_b=1)$, which is able to maximize a sag voltage of a point of common coupling, and using $P_{max}$ as an interpolation point to ensure that an interpolation curve passes through a maximum point of the voltage sag amplitude, and providing an initial value point for a positive cut iteration.

6. The system of claim 1, wherein the processor is configured to:

designate a root $P_{ia}$ of the fault voltage equation as an initial iteration value of a positive cut iteration manner, obtain a precise critical point position by iteration, wherein an iteration expression of a critical fault distance obtained based on the positive cut iteration manner is as follows:

$$P_{k+1} = P_k - \frac{(U(p_k) - U_{th})(p_k - p_{k-1})}{U(p_k) - U(p_{k-1})}$$

where, $P_{k+1}$ denotes the critical fault distance for the (k−1)th solution, $p_k$ denotes the critical fault distance for the kth solution, $p_{k+1}$ denotes the critical fault distance solved for the (k+1)th solution, $U(p_k)$ denotes the voltage sag amplitude at the node S whose position variable is $p_k$, $U(p_{k-1})$ denotes the voltage sag amplitude at the node S whose position variable is $p_{k-1}$, and $U_{th}$ denotes a sensitive load voltage sag threshold; and a convergence condition for the positive cut iteration manner is:

$$\|U(p_{k+1})\| - U_{th}| < \varepsilon$$

where, $U(p_{k-1})$ denotes the voltage sag amplitude at the node S whose position variable is $p_{k-1}$, $U_{th}$ denotes the sensitive load voltage sag threshold.

7. The system of claim 1, wherein the regulation hardware includes one or more of a backup electricity supply, a dynamic voltage regulator, and a load switch; and the regulation instruction includes one or more of a backup electricity supply instruction, a voltage self-regulation instruction, and a switch instruction;

the backup electricity supply is configured to: provide an electricity supply corresponding to the estimated impact load after receiving the backup electricity supply instruction;

the dynamic voltage regulator is configured to: provide a compensating voltage corresponding to the estimated impact load after receiving the voltage self-regulation instruction; and the load switch is configured to: control the estimated impact load and connection and disconnection of the distribution network after receiving the switch instruction.

8. The system of claim 1, wherein the processor is further configured to:

construct an electricity feature map based on the one or more given parameters, the electricity parameter sequence, the photovoltaic output power information, line base data, future lighting data, and a sensitive load threshold;

obtain, by inputting the electricity feature map into a voltage sag risk model, a voltage sag risk region; and determine, by calculating a plurality of voltage sag domains within the voltage sag risk region corresponding to the one or more given parameters and the sensitive load threshold, the voltage sag domain identification result.

9. The system of claim 8, wherein a training process of the voltage sag risk model includes an initial training phase and an intensive training phase performed separately using training data; wherein the initial training phase is performed by constructing the training data based on a generalized dataset obtained from a cloud platform; the intensive training phase is performed by constructing the training data based on data actually collected from the distribution network;

the training data includes training samples and labels corresponding to the training samples; the training samples including a sample electricity feature map constructed based on one or more sample given parameters, a sample electricity parameter sequence, sample photovoltaic output power information, sample line base data, sample future lighting data, and a sample sensitive load threshold; the labels corresponding to the training samples being a region of the voltage sag domain corresponding to the sample sensitive load;

sample sizes corresponding to the distribution network of different complexity levels in the training data of the initial training phase is not less than a preset threshold, the preset threshold being determined based on the complexity level of the corresponding electricity grid.

\* \* \* \* \*